(12) United States Patent
Saito et al.

(10) Patent No.: US 6,527,454 B1
(45) Date of Patent: Mar. 4, 2003

(54) OPTICAL MODULE FOR RECEIVING AND TRANSMITTING LIGHT SIGNAL IN OPTICAL COMMUNICATION

(75) Inventors: Takeshi Saito, Tokyo (JP); Shinichi Kaneko, Tokyo (JP)

(73) Assignee: Mitsubishi Denki Kabushiki Kaisha, Chiyoda-Ku (JP)

( * ) Notice: Subject to any disclaimer, the term of this patent is extended or adjusted under 35 U.S.C. 154(b) by 0 days.

(21) Appl. No.: 09/546,523

(22) Filed: Apr. 11, 2000

(30) Foreign Application Priority Data

Oct. 7, 1999 (JP) .......................................... 11-287015

(51) Int. Cl.[7] ............................................... G02B 6/42
(52) U.S. Cl. ............................. 385/88; 385/49; 385/45
(58) Field of Search ............................... 385/15, 18, 31, 385/41–45, 88–89, 49

(56) References Cited

U.S. PATENT DOCUMENTS

| | | | | |
|---|---|---|---|---|
| 5,479,547 A | * | 12/1995 | Kunikane et al. | 385/47 |
| 5,633,962 A | * | 5/1997 | Kurata | 385/24 |
| 5,799,120 A | * | 8/1998 | Kurata et al. | 385/45 |
| 5,825,951 A | * | 10/1998 | Kitamura | 385/45 |
| 5,960,135 A | * | 9/1999 | Ozawa | 385/24 |
| 6,085,000 A | * | 7/2000 | Tanaka et al. | 385/45 |
| 6,241,399 B1 | * | 6/2001 | Nobuhara | 385/84 |
| 6,257,772 B1 | * | 7/2001 | Nakanishi et al. | 385/89 |

FOREIGN PATENT DOCUMENTS

JP 2000-75155 * 3/2000

OTHER PUBLICATIONS

Hashimoto, T., et al., "1.3/1.55 μm WDM Optical Module for Simultaneous Transmission/Reception using PLC Platform." The Institute of Electronics, Information and Communication Engineers, Electronics Society Convention Lecture 1998, C–3–110, p. 244 (with partial English translation).

Okano, Hiroaki, et al., "Waveguide Type Optical Modules for Fiber–To–The–Home." Hitachi Electric Wire, Report No. 17 (1998–1) pp. 1–8 (with partial English translation).

Ito, Kazuhiko, et al., "Dielectric Multilayer Thin Film Fabrication Process and the Application for Optical Telecommunication." The Institute of Electronics, Information and Communication Engineers, Technical Report of IEICE, EMD99–6(1999–05), pp. 7–12 (with partial English translation).

* cited by examiner

Primary Examiner—Rodney Bovernick
Assistant Examiner—Juliana K. Kang
(74) Attorney, Agent, or Firm—Burns, Doane, Swecker & Mathis, LLP

(57) ABSTRACT

An optical waveguide has a wavelength division multiplexing (WDM) filter, a first core, a second core and a cladding portion. A reception-light signal having a 1.5 μm wavelength band transmits through the second core and the WDM filter, and the reception-light signal transmits through an optical fiber and is detected by a photodiode. In contrast, a transmission-light signal having a 1.3 μm wavelength band transmits through the first core, and a major portion of the transmission-light signal is reflected to the second core by the WDM filter and is output to an outside. The remaining portion of the transmission-light signal undesirably transmits through the WDM filter. Also, stray light derived from the transmission-light signal transmits through the cladding portion of the optical waveguide and the WDM filter. Because a direction of a prolonged line of the first core extending toward the WDM filter differs from an extending direction of the optical fiber, either the remaining portion of the transmission-light signal or the stray light does not transmit through the optical fiber, so that either the transmission-light signal or the stray light is not detected by the photodiode. Accordingly, a cross-talk can be prevented, and an optical communication can be performed at a high quality.

24 Claims, 7 Drawing Sheets

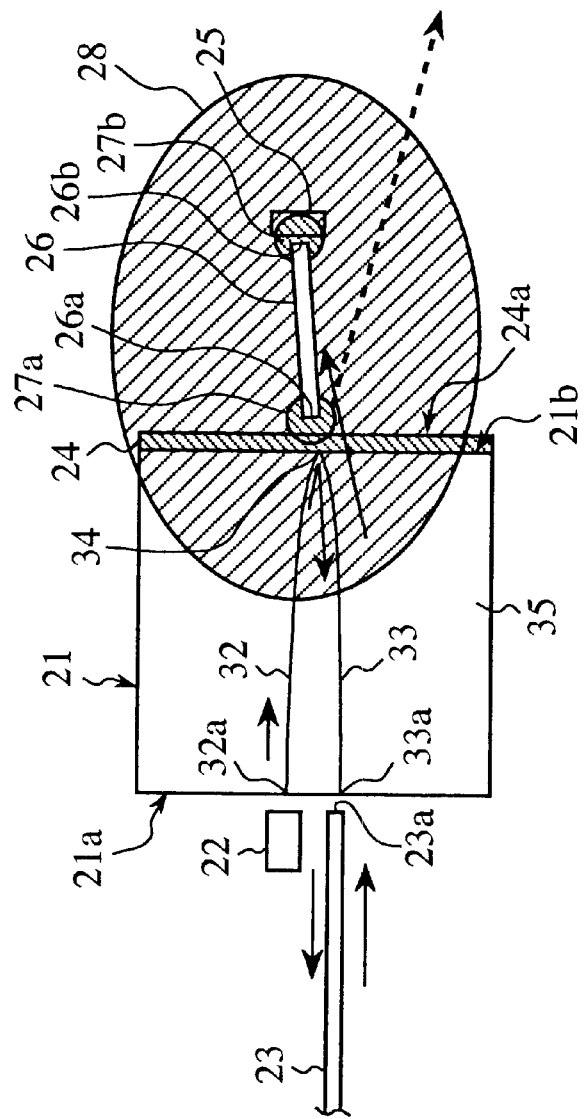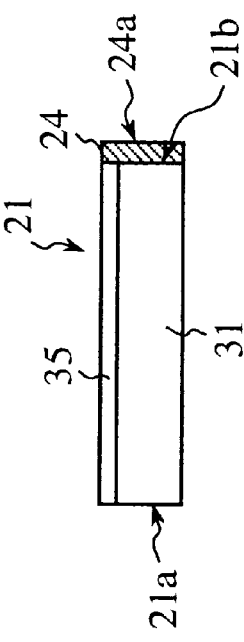

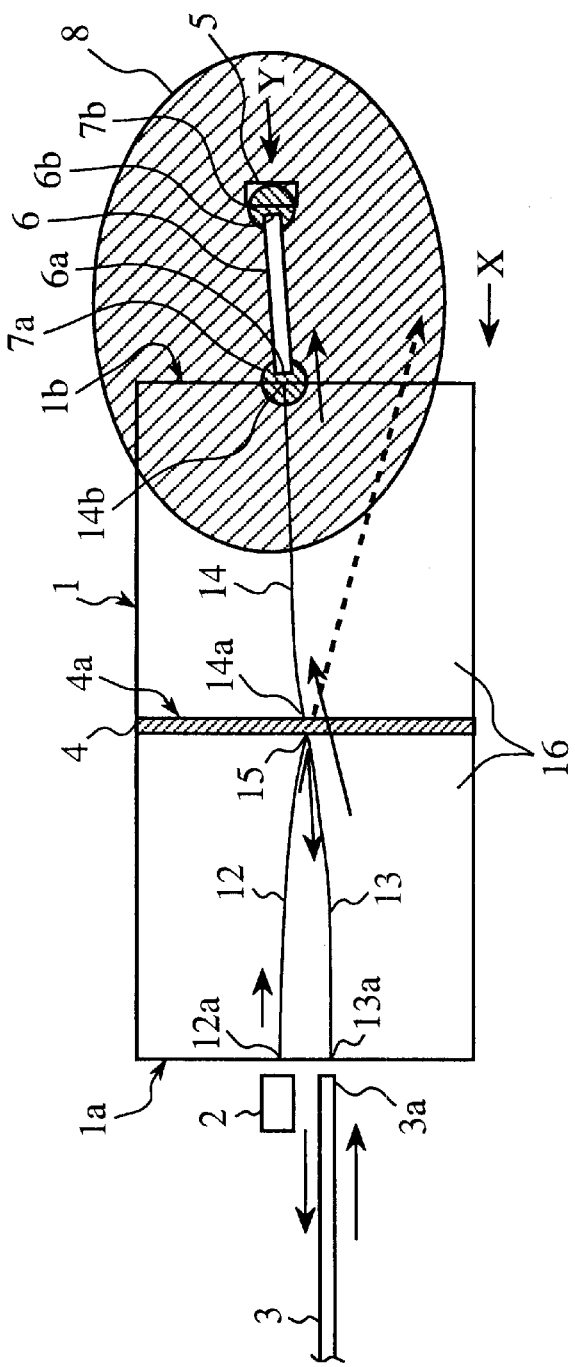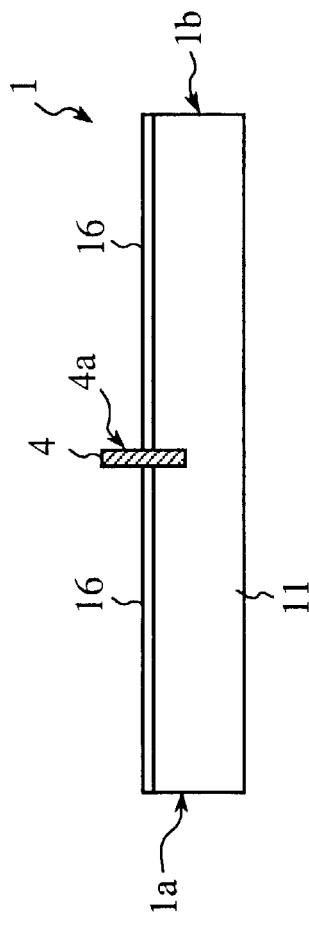

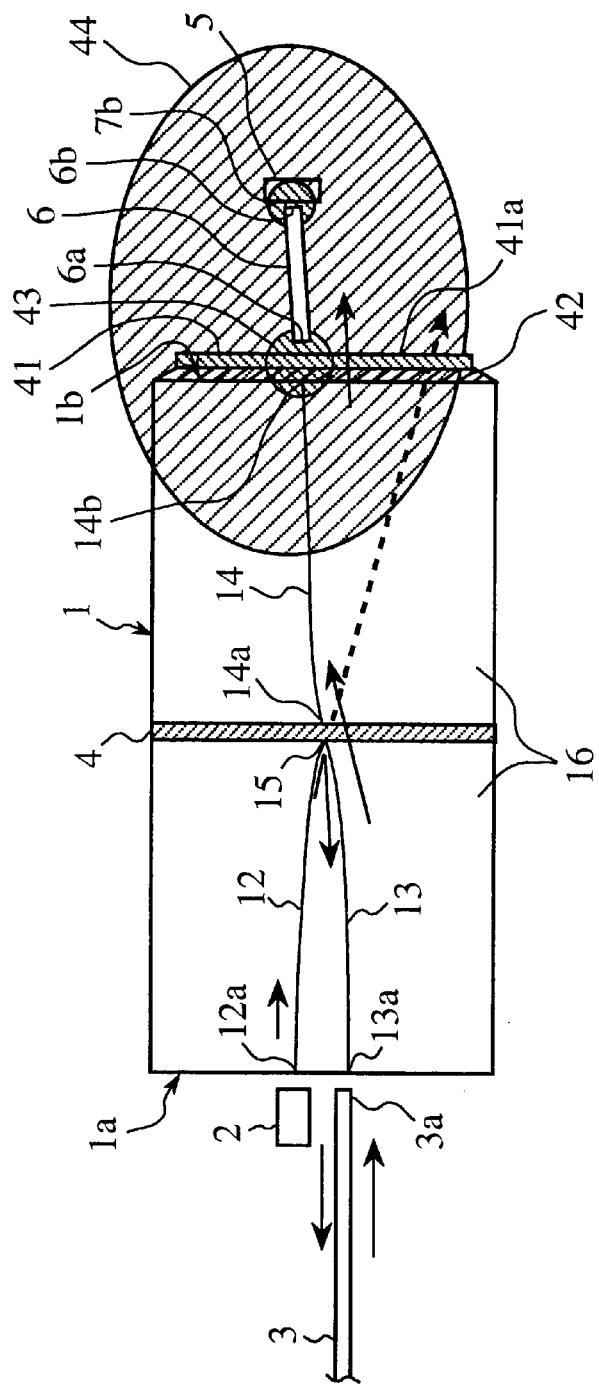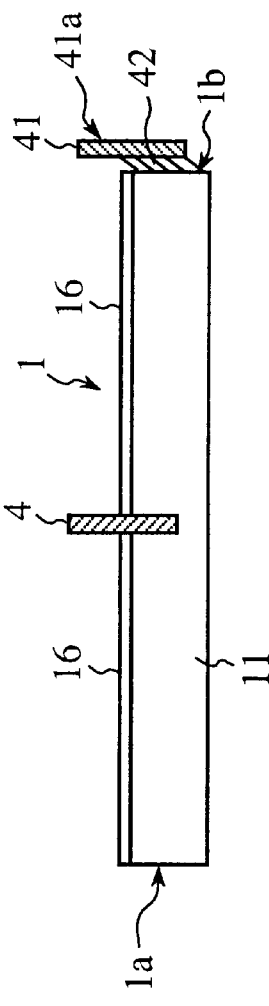
FIG.3A
FIG.3B

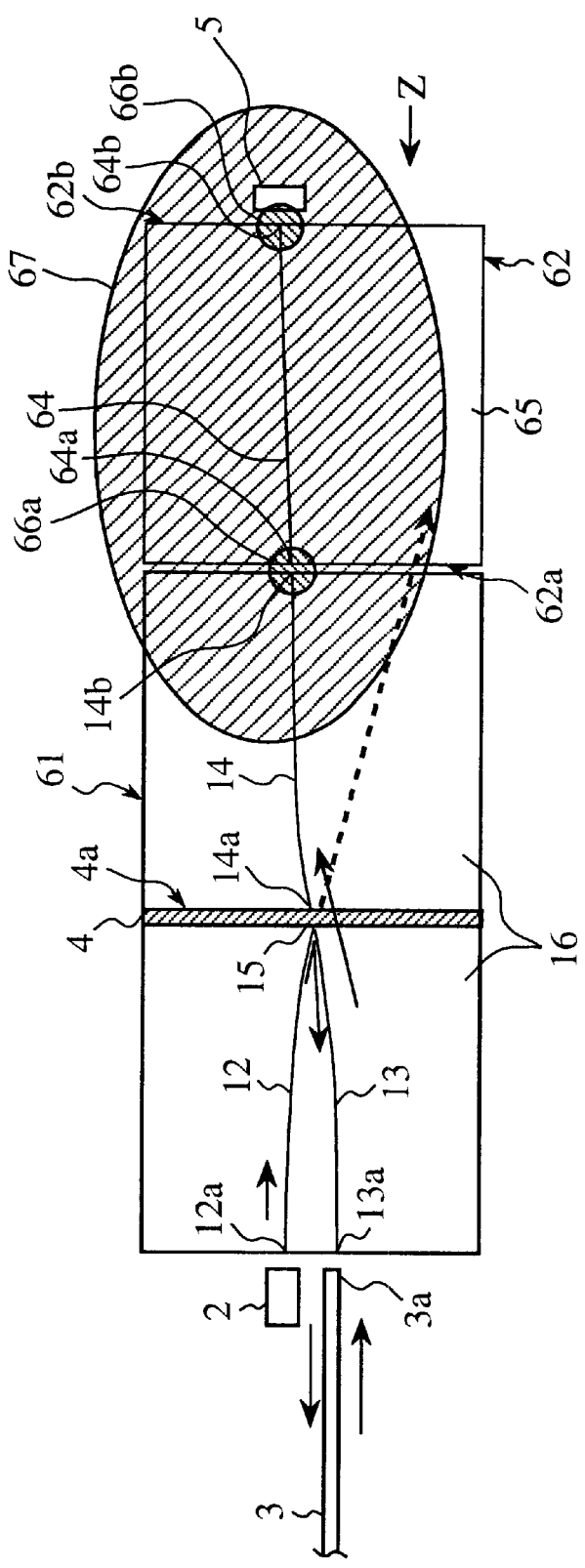
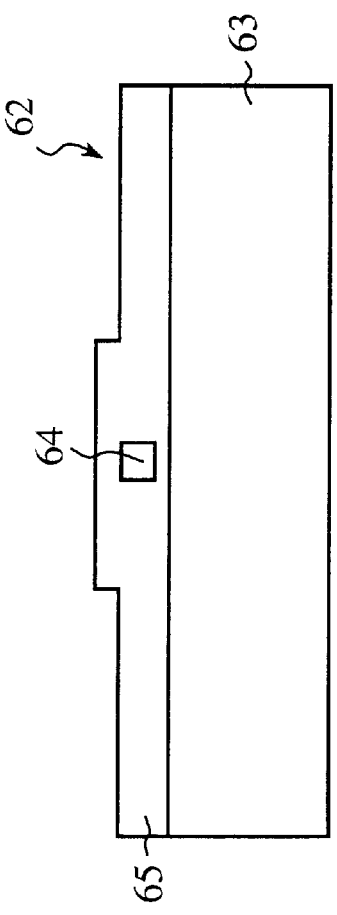
FIG.7A
FIG.7B

OPTICAL MODULE FOR RECEIVING AND TRANSMITTING LIGHT SIGNAL IN OPTICAL COMMUNICATION

BACKGROUND OF THE INVENTION

1. Field of the Invention

The present invention relates to an optical module used for the reception and transmission of a light signal in an optical communication.

2. Description of Related Art

FIG. 11 is an upper view showing an optical configuration of a transmission-reception unity type of optical module corresponding to a first prior art. A travelling direction of each light signal is indicated by arrows.

As shown in FIG. 11, an optical module is composed of a for-transmission laser diode 102 (sometimes called LD) for outputting a transmission-light signal of a 1.3 μm wavelength band;

an optical fiber 103 for receiving a reception-light signal of a 1.5 μm wavelength band from an outside and transmitting the transmission-light signal output from the for-transmission laser diode 102 to the outside;

an optical waveguide 101, having a first end surface 101a facing on both the for-transmission laser diode 102 and the optical fiber 103 and a second end surface 101b, for transmitting the transmission-light signal output from the for-transmission laser diode 102 and the reception-light signal output from the optical fiber 103; and a for-reception photodiode 105 (sometimes called PD), acing on the second end surface 101b of the optical waveguide 101, for receiving the reception-light signal transmitting through the optical waveguide 101.

The optical waveguide 101 is composed of a first core 112, of which one end faces on the for-reception laser diode 102, for transmitting the transmission-light signal of the 1.3 μm wavelength band output from the for-transmission laser diode 102;

a second core 113, of which one end faces on the optical fiber 103 and of which the other end is connected with the other end of the first core 112 at a connection point 115, for transmitting the reception-light signal received in the optical fiber 103;

a wavelength division multiplexing (WDM) filter 104, which is arranged in a groove formed in the optical waveguide 101 and on which the connection point 115 is positioned, for imperfectly reflecting the transmission-light signal transmitting through the first core 112 to the second core 113 to transmit the transmission-light signal to the outside through the second core 113 and the optical fiber 103 and passing the reception-light signal transmitting through the second core 113 and a portion of the transmission-light signal transmitting through the first core 112;

a third core 114, of which one end faces on the other ends of the first and second cores 112 and 113 and the other end 114a faces on the for-reception photodiode 105, for transmitting the reception-light signal and the portion of the transmission-light signal passing through the WDM filter 104 and sending the reception-light signal and the portion of the transmission-light signal to the for-reception photodiode 105; and a cladding body 116 surrounding the first core 112, the second core 113, the third core 114 and the WDM filter 104.

The for-reception PD 105 is positioned on a prolonged line of the third core 114 and is arranged in the neighborhood of the end 114a of the third core 114. The end 114a of the third core 114 denotes a light outputting position from which the reception-light signal transmitting through the second core 113 and passing through the WDM filter 104 are output.

In the above configuration, an operation of the optical module is described.

A transmission-light signal of a 1.3 μm wavelength band emitted from the for-transmission LD 102 transmits through the first core 112 and is reflected by the WDM 104 to the second core 113, and the transmission-light signal is coupled with the optical fiber 103. Therefore, the transmission-light signal is output to the outside.

Also, a reception-light signal of a 1.5 μm wavelength band, which is transmitted from the outside and is received in the optical fiber 103, transmits through the second and third cores 113 and 114 while passing through the WDM filter 104, and the reception-light signal is detected in the for-reception PD 105.

Therefore, an optical communication can be performed between the side of the optical module and the outside.

In this case, because the transmission-light signal is not perfectly reflected by the WDM 104, a portion of the reception-light signal undesirably passes through the WDM 104 and the third core 114 and is detected in the for-reception PD 105.

FIG. 12 is an upper view showing an optical configuration of a transmission-reception unity type of optical module corresponding to a second prior art. A travelling direction of each light signal is indicated by arrows.

As shown in FIG. 12, an optical module is composed of a for-transmission laser diode 122 (sometimes called LD) for outputting a transmission-light signal of a 1.3 μm wavelength band;

an optical fiber 123 for receiving a reception-light signal of a 1.5 μm wavelength band from an outside and transmitting the transmission-light signal output from the for-transmission laser diode 122 to the outside;

an optical waveguide 121, having a first end surface 121a facing on both the for-transmission laser diode 122 and the optical fiber 123 and a second end surface 121b, for transmitting the transmission-light signal output from the for-transmission laser diode 122 and the reception-light signal output from the optical fiber 123; and a for-reception photodiode 125 (sometimes called PD), facing on the second end surface 121b of the optical waveguide 121, for receiving the reception-light signal transmitting through the optical waveguide 121.

The optical waveguide 121 is composed of a first core 132, of which one end faces on the for-reception laser diode 122, for transmitting the transmission-light signal of the 1.3 μm wavelength band output from the for-transmission laser diode 122;

a second core 133, of which one end faces on the optical fiber 123 and of which the other end is connected with the other end of the first core 132 at a connection point 134, for transmitting the reception-light signal received in the optical fiber 123;

a WDM filter 124, which is arranged on the second end surface 121b of the optical waveguide 121 and on which the connection point 134 is positioned, for imperfectly reflecting the transmission-light signal transmitting through the first core 132 to the second core 133 to transmit the transmission-light signal to the outside through the second core 133 and the optical fiber 123 and passing the reception-light signal transmitting through the second core 133 and a portion of the transmission-light signal transmitting through the first core 132; and a cladding body 135 surrounding the first core 132, the second core 133 and the WDM filter 124.

The for-reception PD 125 is positioned on a prolonged line of the second core 133 and is arranged in the neighborhood of the connection point 134 connecting the first and second cores 132 and 133. The connection point 134 denotes a light outputting position from which the reception-light signal transmitting through the second core 133 and passing through the WDM filter 124 are output.

In the above configuration, an operation of the optical module corresponding to the second prior art is described.

A transmission-light signal of a 1.3 μm wavelength band emitted from the for-transmission LD 122 transmits through the first core 132 and is reflected by the WDM 124 to the second core 133, and the transmission-light signal is coupled with the optical fiber 123. Therefore, the transmission-light signal is output to the outside.

Also, a reception-light signal of a 1.5 μm wavelength band, which is transmitted from the outside and is received in the optical fiber 123, transmits through the second core 133 and the WDM filter 124, and the reception-light signal is detected in the for-reception PD 125.

Therefore, an optical communication can be performed between the side of the optical module and the outside.

In this case, because the transmission-light signal is, not perfectly reflected by the WDM 124, a portion of the reception-light signal undesirably passes through the WDM 124 and is detected in the for-reception PD 125.

As described above, though a main portion of the transmission-light signal of the 1.3 μm wavelength band is reflected by the WDM filter 104 (or 124), the remaining portion of the transmission-light signal transmits through the WDM filter 104 (or 124). The transmission degree of the transmission-light signal depends on the performance of the WDM filter 104 (or 124).

Also, the for-reception PD 105 (or 125) is normally sensitive to both the transmission-light signal of the 1.3 μm wavelength band and the reception-light signal of the 1.5 μm wavelength band. Therefore, the remaining portion of the transmission-light signal, which is emitted from the for-transmission LD 102 (or 122) and transmits through the first core 112 (or 132), transmits through the WDM filter 104 (or 124), and the remaining portion of the transmission-light signal is detected with the reception-light signal by the for-reception PD 105 (or 125).

Accordingly, because the remaining portion of the transmission-light signal transmits through the WDM filter 104 (or 124), an optical cross-talk based on the mixture of the transmission-light signal with the reception-light signal occurs in the for-reception PD 105 (or 125). Therefore, the reduction of an optical cross-talk is limited to a value ranging from 40 dB to 50 dB, so that there is a drawback that the optical communication cannot be performed at a sufficiently high quality.

Also, a portion of the transmission-light signal emitted from the for-transmission LD 102 (or 122) transmit through a cladding body surrounding the cores and/or a substrate of the optical waveguide 101 (or 121) as stray light. Therefore, the stray light transmitting through the cladding body and/or the substrate is undesirably detected in the for-reception PD 105 (or 125), so that an optical cross-talk based on the mixture of the stray light with the reception-light signal occurs in the for-reception PD 105 (or 125).

SUMMARY OF THE INVENTION

An object of the present invention is to provide an optical module in which an optical communication is performed while reducing an optical cross-talk based on the mixture of a transmission-light signal with a reception-light signal or/and an optical cross-talk based on the mixture of stray light with a reception-light signal.

The object is achieved by the provision of an optical module, comprising:

transmission-light signal emitting means for emitting a transmission-light signal having a first wavelength band;

an optical fiber for receiving a reception-light signal having a second wavelength band from an outside and transmitting the transmission-light signal emitted from the transmission-light signal emitting means to the outside;

an optical waveguide for transmitting the transmission-light signal emitted from the transmission-light signal emitting means and the reception-light signal received by the optical fiber, giving a first travelling direction characteristic corresponding to a first direction to the reception-light signal and outputting the transmission-light signal to the optical fiber to transmit the transmission-light signal to the outside;

light transmitting means, extending in the first direction at a first end facing on the optical waveguide, for receiving the reception-light signal having the first travelling direction characteristic from the optical waveguide at the first end and transmitting the reception-light signal; and reception-light signal detecting means for detecting the reception-light signal transmitting through the light transmitting means, wherein the optical waveguide comprises a first core, having a first end facing on the transmission-light signal emitting means and a second end and extending in a second direction differing from the first direction at the second end, for transmitting the transmission-light signal received at the first end, giving a second travelling direction characteristic corresponding to the second direction to the transmission-light signal and outputting the transmission-light signal from the second end;

a second core, connected with the second end of the first core at a connection point, for transmitting the reception-light signal; and a main filter, on which the connection point is placed, for reflecting a major portion of the transmission-light signal received at the connection point from the first core to the second core to output the major portion of the transmission-light signal from the optical fiber to the outside, transmitting the remaining portion of the transmission-light signal received at the connection point from the first core and the reception-light signal received at the connection point from the second core and sending the reception-light signal of the first travelling direction characteristic to the light transmitting means to make the reception-light signal detecting means detect the reception-light signal, while preventing the remaining portion of the transmission-light signal of the second travelling direction characteristic from being sent to the light transmitting means.

In the above configuration, because a first travelling direction characteristic is given to a reception-light signal received at the optical fiber from the outside when the reception-light signal transmits through the second core and the main filter of the optical waveguide, the reception-light signal can transmit through the light transmitting means, so that the reception-light signal of the second wavelength band is detected by the reception-light signal detecting means.

In contrast, a transmission-light signal emitted from the transmission-light signal emitting means transmits through the first core of the optical waveguide, and a second travelling direction characteristic is given to the transmission-light signal. Thereafter, a major portion of the transmission-light signal is reflected to the second core by the main filter and is output from the optical fiber to the outside. Also, the remaining portion of the transmission-light signal having the second travelling direction characteristic transmits through the main filter. In this case, because the transmission-light signal has the second travelling direction characteristic, the transmission of the remaining portion of the transmission-light signal to the light transmitting means is prevented. Therefore, the transmission-light signal is not detected by the reception-light signal detecting means.

Also, a portion of the transmission-light signal emitted from the transmission-light signal emitting means transmits as stray light through an area of the optical waveguide other than the first and second cores, and the stray light transmits through the main filter. Assuming that the light transmitting means is not arranged between the optical waveguide and the reception-light signal detecting means, the stray light is undesirably detected by the reception-light signal detecting means. However, because the light transmitting means is arranged between the optical waveguide and the reception-light signal detecting means and because the stray light does not have the first travelling direction characteristic, the stray light does not transmit through the light transmitting means, so that the stray light is not detected by the reception-light signal detecting means.

Accordingly, because the second travelling direction characteristic is given to the transmission-light signal by the first core and because a light signal having the first travelling direction characteristic is selectively received by the light transmitting means, the detection of the transmission-light signal by the reception-light signal detecting means is prevented, and an optical cross-talk based on the mixing of the transmission-light signal with the reception-light signal can be prevented.

Also, because the first travelling direction characteristic is not given to the stray light and because a light signal having the first travelling direction characteristic is selectively received by the light transmitting means, the detection of the stray light by the reception-light signal detecting means is prevented, and an optical cross-talk based on the mixing of the stray light with the reception-light signal can be prevented.

It is preferred that the optical waveguide further comprises a third core for receiving a minor portion of the transmission-light signal obtained from the remaining portion of the transmission-light signal transmitting through the main filter, receiving the reception-light signal transmitting through the main filter and transmitting the minor portion of the transmission-light signal and the reception-light signal, the reception-light signal being sent to the light transmitting means to make the reception-light signal detecting means detect the reception-light signal while preventing the other minor portion of the transmission-light signal, which is obtained from the remaining portion of the transmission-light signal and is not received by the third core, from being sent to the light transmitting means.

In this optical waveguide, the reception-light signal transmitting through the main filter and the third core is sent to the light transmitting means and is detected by the reception-light signal detecting means. In contrast, after the remaining portion of the transmission-light signal transmits through the main filter, a minor portion of the transmission-light signal obtained from the remaining portion of the transmission-light signal transmits through the third core, and the other minor portion of the transmission-light signal obtained from the remaining portion of the transmission-light signal does not transmit through the third core but transmits as stray light through an area of the optical waveguide other than the third core. because the stray light does not have the first travelling direction characteristic, the stray light does not transmit through the light transmitting means, so that the stray light is not detected by the reception-light signal detecting means.

Accordingly, the transmission of the other minor portion of the transmission-light signal to the light transmitting means is prevented, and the detection of the transmission-light signal by the reception-light signal detecting means is reduced to a minimum. Therefore, an optical cross-talk based on the mixing of the transmission-light signal with the reception-light signal can be reduced to a minimum, and an optical cross-talk based on the mixing of the stray light with the reception-light signal can be prevented.

It is preferred that the second core extend in the first direction at the connection point to give the first travelling direction characteristic corresponding to the first direction to the reception-light signal in the second core.

Because the first travelling direction characteristic is given to the reception-light signal, the reception-light signal can transmit through the light transmitting means, so that the reception-light signal can be selectively detected by the reception-light signal detecting means while preventing the transmission-light signal of the second travelling direction characteristic from being detected by the reception-light signal detecting means.

It is also preferred that the optical waveguide further comprises:
   a first transparent resin body, filling up a space from a light emitting point placed on the main filter of the optical waveguide to a light incident end of the light transmitting means, for transmitting the reception-light signal output from the light emitting point of the main filter to the light incident end of the light transmitting means;
   a second transparent resin body, filling up a space from a light emitting end of the light transmitting means to the reception-light signal detecting means, for transmitting the reception-light signal output from the light emitting end of the light transmitting means to the reception-light signal detecting-means; and
   an opaque resin body, arranged in a space surrounding a light propagation route from the light emitting point of the main filter to the reception-light signal detecting means through the light transmitting means, for preventing flight transmitted from a surrounding area of the optical module or stray light transmitting through the optical waveguide from being detected by the reception-light signal detecting means.

In this optical module, the opaque resin body shields the space surrounding the light propagation route from light transmitted from a surrounding area of the optical module or stray light transmitting through the optical waveguide. Also, the reception-light signal transmits through the light propagation route while passing through the first and second transparent resin bodies.

Accordingly, an optical cross-talk based on the mixing of the light or the stray light with the reception-light signal can be prevented.

It is also preferred that the optical module further comprises:

- a light shielding film, arranged on a light emitting end surface of the optical waveguide except for an area of the third core, for shielding the light transmitting means and the reception-light signal detecting means from stray light transmitting through an area of the optical waveguide other than the third core.

It is also preferred that the optical module further comprises:

- a light shielding film, arranged on a light emitting surface of the main filter except for a portion corresponding to the connection point of the first and second cores, for shielding the light transmitting means and the reception-light signal detecting means from stray light transmitting through the optical waveguide other than the first and second cores.

In these optical modules, because the light shielding film prevents stray light transmitting through the optical waveguide from being leaked from the optical waveguide, the stray light is not detected by the reception-light signal detecting means. Accordingly, an optical cross-talk based on the mixing of the stray light with the reception-light signal can be moreover prevented.

It is also preferred that the optical module further comprises:

- a supplementary filter, arranged on an end surface of the optical waveguide facing on the light transmitting means, for reflecting the minor portion of the transmission-light signal transmitting through the third core of the optical waveguide and transmitting the reception-light signal transmitting through the third core of the optical waveguide.

In this optical module, the supplementary filter prevents the minor portion of the transmission-light signal from transmitting through the light transmitting means and transmits the reception-light signal to the light transmitting means. Accordingly, the optical cross-talk based on the mixing of the transmission-light signal with the reception-light signal can be prevented.

It is also preferred that the optical module further comprises:

- a first transparent resin body, filling up a space from a light emitting point placed on a light emitting end surface of the optical waveguide to a light incident end of the light transmitting means, for transmitting the reception-light signal output from the light emitting point of the supplementary filter to the light incident end of the light transmitting means;
- a second transparent resin body, filling up a space from a light emitting end of the light transmitting means to the reception-light signal detecting means, for transmitting the reception-light signal output from the light emitting end of the light transmitting means to the reception-light signal detecting means; and
- an opaque resin body, arranged in a space surrounding a light propagation route from the light emitting point of the supplementary filter to the reception-light signal detecting means through the light transmitting means, for preventing light transmitted from a surrounding area of the optical module or stray light transmitting through the optical waveguide from being detected by the reception-light signal detecting means.

In this optical module, the opaque resin body shields the space surrounding the light propagation route from light transmitted from a surrounding area of the optical module or stray light transmitting through the optical waveguide. Also, the reception-light signal transmits through the light propagation route while passing through the first and second transparent resin bodies. Accordingly, an optical cross-talk based on the mixing of the light or the stray light with the reception-light signal can be moreover prevented.

It is also preferred that the optical module further comprises:

- a light shielding film, arranged on a light emitting surface of the supplementary filter except for a portion corresponding to the third core of the optical waveguide, for shielding the light transmitting means and the reception-light signal detecting means from stray light transmitting through the optical waveguide other than the third core.

In this optical module, because the light shielding film prevents stray light transmitting through the optical waveguide other than the third core from being leaked from the optical waveguide, the stray light is not detected by the reception-light signal detecting-means. Accordingly, an optical cross-talk based on the mixing of the stray light with the reception-light signal can be moreover prevented.

It is also preferred that the optical module further comprises:

- a first transparent resin body, filling up a space from a light emitting point placed on the main filter to a light incident end of the light transmitting means, for transmitting the reception-light signal output from the light emitting point of the main filter to the light incident end of the light transmitting means;
- a second transparent resin body, filling up a space from a light emitting end of the light transmitting means to the reception-light signal detecting means, for transmitting the reception-light signal output from the light emitting end of the light transmitting means to the reception-light signal detecting means; and
- an opaque resin body, arranged in a space surrounding a light propagation route from the light emitting point of the main filter to the reception-light signal detecting means through the light transmitting means, for preventing light transmitted from a surrounding area of the optical module or stray light transmitting through the optical waveguide from being detected by the reception-light signal detecting means.

In this optical module, the opaque resin body shields the space surrounding the light propagation route from light transmitted from a surrounding area of the optical module or stray light transmitting through the optical waveguide. Also, the reception-light signal transmits through the light propagation route while passing through the first and second transparent resin bodies. Accordingly, an optical cross-talk based on the mixing of the light or the stray light with the reception-light signal can be moreover prevented.

It is also preferred that the optical module further comprises:

- a light shielding film, arranged on a light emitting surface of the main filter except for a portion corresponding to the connection point of the first and second cores, for shielding the light transmitting means and the reception-light signal detecting means from stray light transmitting through the optical waveguide.

In this optical module, because the light shielding film prevents stray light transmitting through the optical waveguide from being leaked from the optical waveguide, the stray light is not detected by the reception-light signal detecting means. Accordingly, an optical cross-talk based on the mixing of the stray light with the reception-light signal can be moreover prevented.

It is also preferred that the optical module further comprises:

a supplementary filter, arranged on a light incident end and/or a light emitting end of the light transmitting means, for reflecting light having the first wavelength band and transmitting the reception-light signal received from the main filter of the optical waveguide.

In this optical module, even though the remaining portion of the transmission-light signal intends to transmit through the light transmitting means, the supplementary filter prevents light having the first wavelength band from transmitting through the light transmitting means or being output to the reception-light signal detecting means and transmits the reception-light signal to the light transmitting means. Accordingly, the optical cross-talk based on the mixing of the transmission-light signal with the reception-light signal can be moreover prevented.

It is also preferred that the optical module further comprises:

a light shielding film, arranged on a light emitting surface of the light transmitting means except for a core portion of the light transmitting means, for shielding the reception-light signal detecting means from light transmitting through a cladding portion of the light transmitting means.

In this optical module, because the light shielding film shields the reception-light signal detecting means from the light transmitting through the cladding portion of the light transmitting means, the light is not detected by the reception-light signal detecting means. Accordingly, an optical cross-talk based on the mixing of the light transmitting through the cladding portion of the light transmitting means with the reception-light signal can be prevented.

BRIEF DESCRIPTION OF THE DRAWINGS

FIG. 1A is an upper view showing an optical configuration of a transmission-reception unity type of optical module according to a first embodiment of the present invention;

FIG. 1B is a side view of an optical waveguide arranged in the optical module shown in FIG. 1A;

FIG. 2A is an upper view showing an optical configuration of a transmission-reception unity type of optical module according to a second embodiment of the present invention;

FIG. 2B is a side view of an optical waveguide arranged in the optical module shown in FIG. 2A;

FIG. 3A an upper view of an optical configuration of a transmission-reception unity type of optical module according to a third embodiment of the present invention;

FIG. 3B is a side view of an optical waveguide arranged in the optical module shown in FIG. 3A;

FIG. 7A is an upper view showing an optical configuration of a transmission-reception unity type of optical module according to a seventh embodiment of the present invention;

FIG. 7B is a side view of a second optical waveguide arranged in the optical module shown in FIG. 7A;

DETAILED DESCRIPTION OF THE PREFERRED EMBODIMENTS

Figure 4:
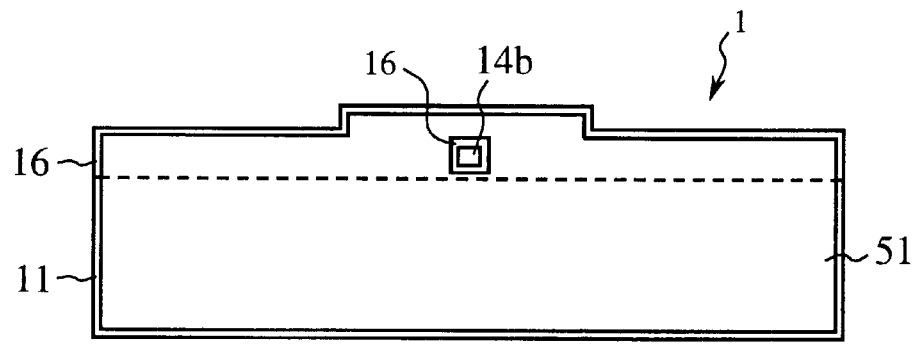
FIG. 4 is a side view of an optical configuration of a transmission-reception unity type of optical module according to a fourth embodiment of the present invention.

The invention will now be described with reference to the accompanying drawings.

Embodiment 1

FIG. 1A is an upper view showing an optical configuration of a transmission-reception unity type of optical module according to a first embodiment of the present invention, and FIG. 1B is a side view of an optical waveguide arranged in the optical module shown in FIG. 1A. A travelling direction of each light signal is indicated by an arrow in FIG. 1A.

As shown in FIG. 1A and FIG. 1B, a transmission-reception unity type of optical module comprises:

a for-transmission laser diode (LD) 22 (functioning as a laser-beam transmitting means) for outputting a transmission-light signal of a 1.3 $\mu$m wavelength band;

a first optical fiber 23 for receiving a reception-light signal of a 1.5 $\mu$m wavelength band from an outside and transmitting the transmission-light signal output from the for-transmission LD 22 to the outside;

an optical waveguide 21, having a first end surface 21a facing on both the for-transmission laser diode 22 and an end 23a of the first optical fiber 23 and a second end surface 21b, for transmitting the transmission-light signal output from the for-transmission laser diode 22 and the reception-light signal output from the first optical fiber 23;

a second optical fiber 26 (functioning as a light transmitting means), of which a light incident end surface 26a faces on the second end surface 21b, for transmitting the reception-light signal output from the optical waveguide 1 and received from the light incident end surface 26a; and a for-reception photodiode (PD) 25 (functioning as a laser beam receiving means), facing on a light emitting end surface 26b of the second optical fiber 26, for detecting the reception-light signal output from the light emitting end surface 26b of the second optical fiber 26.

The optical waveguide 21 comprises:

a first core 32, of which a for-transmission LD side end 32a faces on the for-reception laser diode 22, for transmitting the transmission-light signal of the 1.3 $\mu$m wavelength band output from the for-transmission laser diode 22, the transmission-light signal having a first travelling direction characteristic corresponding to a direction (shown in FIG. 1A by a broken-line arrow) of a prolonged line of the first core 32 extending toward the other side end, and the direction of the prolonged line of the first core 32 differing from an extending direction of the second optical fiber 26;

a second core 33, of which a first optical fiber side end 33a faces on the first optical fiber 23 and of which the other end is connected with the other end of the first core 32 at a connection point 34 to form a V-shaped connection with the first core 32, for transmitting the reception-light signal received in the first optical fiber 23, the reception-light signal having a second travelling direction characteristic corresponding to a direction of a prolonged line of the second core 33 on the other side, and the direction of the prolonged line of the second core 33 agreeing with the extending direction of the second optical fiber 26;

a wavelength division multiplexing (WDM) filter 24 (functioning as a main filter), of which a light outputting side surface 24a faces on the light incident end surface 26a of the second optical fiber 26 and in which the connection point 34 is placed on the other side surface, for imperfectly reflecting the transmission-light signal transmitting through the first core 32 to the second core 33, which forms the V-shaped connection with the first core 32, to transmit the transmission-light signal to the outside through the second core 23 and the first optical fiber 32, transmitting a portion of the transmission-light signal of the first core 32 to an outside of the optical waveguide 21 and transmitting the reception-light signal of the second cord 33 to the second optical fiber 26, the first travelling direction characteristic of the portion of the transmission-light signal differing from the second travelling direction characteristic of the reception-light signal because of the V-shaped connection between the first and second cores 12 and 13 on the WDM filter 4;

a cladding body 35 surrounding the first core 32 and the second core 33 and contacting with the WDM filter 24; and a substrate 31 arranged under the cladding body 35 to support the first core 32, the second core 33, the WDM filter 24 and the cladding body 35.

The transmission-reception unity type of optical module further comprises:

a first transparent resin body 27a, filling up a space from a portion of the light outputting side surface 24a of the optical waveguide 21 corresponding to the connection point 34 of the first and second cores 32 and 33 to the light incident end surface 26a of the second optical fiber 26, for transmitting the reception-light signal output from the second core 33 of the optical waveguide 21 to the second optical fiber 26 at a considerably low loss of the reception-light signal;

a second transparent resin body 27b, filling up a space from the light emitting end surface 26b of the second optical fiber 26 to the for-reception photodiode 25, for transmitting the reception-light signal output from the second optical fiber 26 to the for-reception photodiode 25 at a considerably low loss of the reception-light signal; and an opaque resin body 28, arranged in a space surrounding a light propagation route from the light outputting side surface 24a of the optical waveguide 21 to the for-reception photodiode 25 through the first and second transparent resin bodies 27a and 27b and the second optical fiber 26, for preventing light transmitted from a surrounding area of the optical module and stray light transmitting-through the optical waveguide 21 from being detected in the for-reception photodiode 25.

Areas of the WDM filter 24, the transparent resin bodies 27a and 27b and the opaque resin body 28 are hatched in FIG. 1A and FIG. 1B.

The first optical fiber 23 is made of a single-mode type optical fiber, and the second optical fiber 26 is made of a multi-mode type optical fiber. The second optical fiber 26 has a prescribed length to obtain a desired characteristic.

The connection point 34 of the first and second cores 32 and 33 is placed at the tip of a V-shaped portion formed by the first and second cores 32 and 33 and denotes a light output point at which the reception-light signal of the 1.5 $\mu$m wavelength band is output from the optical waveguide 21. The for-transmission LD side end 32a of the first core 32 and the first optical fiber side end 33a of the second core 33 are placed on the first end surface 21a of the optical waveguide 21.

The for-transmission LD 22 is placed on a prolonged line of the LD side end 32a of the first core 32 and is positioned in the neighborhood of the LD side end 32a, so that the transmission-light signal emitted from the for-transmission LD 22 is smoothly sent to the end 32a of the first core 32 at a considerably low loss. The end 23a of the first optical fiber 23 is placed on a prolonged line of the fiber side end 33a of the second core 33 and is positioned in the neighborhood of the fiber side end 33a, the other end of the first optical fiber 23 is directed to the outside, so that the reception-light signal received from the outside in the first optical fiber 23 is smoothly sent to the end 33a of the second core 33 at a considerably low loss.

The light incident end surface 26a of the second optical fiber 26 is placed on a prolonged line of the second core 33 toward a side of the WDM filter 24 and is positioned in the neighborhood of the WDM filter 24. Therefore, the reception-light signal transmitting through the WDM filter 24 is smoothly sent to the second optical fiber 26 at a considerably low loss. The for-reception PD 25 is placed on a prolonged line of the light emitting end surface 26b of the second optical fiber 26 and is positioned in the neighborhood of the light emitting end surface 26b, so that the reception-light signal transmitting though a core portion of the second optical fiber 26 is smoothly detected by the for-reception PD 25 at a considerably low loss.

The first and second transparent resin bodies 27a and 27b have the almost same refractive index as those of the cores 32 and 33, so that the reception-light signal transmitting through the second core 33 is smoothly sent to the second optical fiber 26 at a considerably low loss. Also, the first and second transparent resin bodies 27a and 27b are transparent for the reception-light signal of the 1.5 $\mu$m wavelength band, so that the reception-light signal is not absorbed by the first and second transparent resin bodies 27a and 27b.

The WDM filter 24 is formed by depositing a material of the WDM filter 24 on the second end surface 21b of the optical waveguide 24. However, it is applicable that a film type of WDM filter be attached to the second end surface 21b of the optical waveguide 24.

In the above configuration, an operation of the optical module is described.

A reception-light signal of the 1.5 $\mu$m wavelength band received from the outside in the first optical fiber 23 is sent from the end 23a of the first optical fiber 23 to the fiber side end 33a of the optical waveguide 21. In the optical waveguide 21, the reception-light signal transmits through the second core 33. Thereafter, the reception-light signal is sent from the connection point 34 placed on the WDM filter 24 to the end 26a of the second optical fiber 26 while passing through the WDM filter 24. In this case, the reception-light signal has a second travelling direction characteristic corresponding to a direction of a prolonged line of the second core 33 toward a side of the WDM filter 24, so that the intensity of the reception-light signal becomes strongest in the direction of the prolonged line of the second core 33. Because this direction of the prolonged line of the second core 33 agrees with an extending direction of the second optical fiber 26 toward the WDM filter 24 of the optical waveguide 21, the reception-light signal having the second travelling direction characteristic can be easily coupled with the second optical fiber 26 and transmits through the first and second transparent resin bodies 27a and 27b and the second optical fiber 26. Therefore, the reception-light signal can be detected by the for-reception PD 25 at a low power loss.

A reception-light signal of the 1.5 μm wavelength band received from the outside in the first optical fiber 23 is sent from the end 23a of the first optical fiber 23 to the fiber side end 33a of the optical waveguide 21. In the optical waveguide 1, the reception-light signal transmits through the second core 33. Thereafter, the reception-light signal is sent from the connection point 34 placed on the WDM filter 24 to the end 26a of the second optical fiber 26 while passing through the WDM filter 24. In this case, the reception-light signal has a second travelling direction characteristic corresponding to a direction of a prolonged line of the second core 33 toward a side of the WDM filter 24, so that the intensity of the reception-light signal becomes strongest in the direction of the prolonged line of the second core 33. Because this direction of the prolonged line of the second core 33 agrees with an extending direction of the second optical fiber 26 toward the WDM filter 24 of the optical waveguide 21, the reception-light signal having the second travelling direction characteristic can be easily coupled with the second optical fiber 26 and transmits through the first and second transparent resin bodies 27a and 27b and the second optical fiber 26. Therefore, the reception-light signal can be detected by the for-reception PD 25 at a low power loss.

Also, a transmission-light signal of the 1.3 μm wavelength band emitted from the for-transmission LD 22 is sent to the optical waveguide 21. In the optical waveguide 21, the transmission-light signal transmits through the first core 32, and a major portion of the transmission-light signal is reflected on the WDM filter 24 and transmits through the second core 33 in a direction opposite to that of the transmission of the reception-light signal. Thereafter, the major portion of the transmission-light signal is sent from the fiber side end 33a of the second core 33 to the end 23a of the first optical fiber 23 and transmits through the second optical fiber 23. Therefore, the transmission-light signal can be output to the outside from the first optical fiber 23.

Because the transmission-light signal is imperfectly reflected on the WDM filter 24, the remaining portion of the transmission-light signal transmits through the WDM filter 24 and is output to an outside of the optical waveguide 21. In this case, the remaining portion of the transmission-light signal has a first travelling direction characteristic corresponding to a first direction (shown in FIG. 1A by the broken-line arrow) of a prolonged line of the first core 32 extending toward the WDM filter 24, so that the intensity of the transmission-light signal becomes strongest in the first direction of the prolonged line of the first core 32. Because the first core 32 and the second core 33 are connected to each other at the connection point 34 of the WDM filter 24 to form a V-shaped connection, the direction of the prolonged line of the first core 32 does not agree with the extending direction of the second optical fiber 26, so that the first travelling direction characteristic of the remaining portion of the transmission-light signal differs from the second travelling direction characteristic of the reception-light signal. Therefore, the intensity of the remaining portion of the transmission-light signal is very weak in the extending direction of the second optical fiber 26, the remaining portion of the transmission-light signal output to the outside of the optical waveguide 21 is not coupled to the second optical fiber 26, so that the remaining portion of the transmission-light signal does not transmit through the second optical fiber 26. Accordingly, no transmission-light signal is detected in the for-reception PD 25.

Also, a portion of the transmission-light signal emitted from the for-transmission LD 22 transmits through the cladding body 35 and/or the substrate 31 of the optical waveguide 21 as stray light. However, because a travelling direction of the stray light generally differs from the extending direction of the second optical fiber 26, the stray light does not transmit through the second optical fiber 26 but is absorbed by the opaque resin body 28. Accordingly, stray light detected in the for-reception PD 25 can be considerably reduced.

Also, in cases where the optical module is arranged in a package, a portion of the transmission-light signal emitted from the for-transmission LD 22 is reflected on the package surface, so that the reflected light returns to the optical module. In this case, assuming that the opaque resin body 28 is not arranged in a space surrounding a light propagation route from the light outputting side surface 24a of the optical waveguide 21 to the for-reception PD 25, the reflected light transmits through the light propagation route or directly goes to the for-reception PD 25. Because the for-reception PD 25 has a sensitivity for light of the 1.3 μm wavelength band as well as light of the 1.5 μm wavelength band, there is a probability that the reflected light transmitting through the light propagation route or directly going to the for-reception PD 25 is undesirably detected in the for-reception PD 25. In this embodiment, because the space surrounding the light propagation route is covered with the opaque resin body 28, the reflected light transmitted from a surrounding area of the optical module is not detected in the for-reception PD 25.

Accordingly, because the direction of the prolonged line of the first core 32 on the side of the WDM filter 24 does not agree with the extending direction of the second optical fiber 26 toward the WDM filter 24, the transmission of the transmission-light signal to the second optical fiber 26 can be prevented, and the transmission of the stray light to the second optical fiber 26 can be prevented. Therefore, light other than the reception-light signal is not detected in the for-reception PD 25. As a result, an optical cross-talk based on the mixing of the transmission-light signal with the reception-light signal can be prevented, and an optical cross-talk based on the mixing of the stray light with the reception-light signal can be prevented.

Also, the space from the portion of the light outputting side surface 24a of the optical waveguide 21 corresponding to the connection point 34 of the first and second cores 32 and 33 to the light incident end surface 26a of the second optical fiber 26 is filled up with the first transparent resin body 27a, the space from the light emitting end surface 26b of the second optical fiber 26 to the for-reception photodiode 25 is filled up with the second transparent resin body 27b, and the space surrounding the light propagation route from the light outputting side surface 24a of the optical waveguide 21 to the for-reception photodiode 25 through the first and second transparent resin bodies 27a and 27b and the second optical fiber 26 is filled up with the opaque resin body 8. Therefore, the reception-light signal can be detected in the for-reception PD 25 at a considerably low loss while preventing the detection of the stray light or the reflected light transmitted from a surrounding area of the optical module. Therefore, the optical cross-talk based on the mixing of the stray light or the reflected light with the reception-light signal can be prevented, so that an optical communication can be performed at higher quality.

Also, because the second optical fiber 26 is made of a multi-mode type optical fiber, a precision of the positioning of the second optical fiber 26 for the optical waveguide 21 can be made loosened. That is, the assembling of the optical module can be made easy as compared with an optical module in which a single-mode type optical fiber is used as the second optical fiber 26.

Embodiment 2

FIG. 2A is an upper view showing an optical configuration of a transmission-reception unity type of optical module according to a second embodiment of the present invention, and FIG. 2B is a side view of an optical waveguide arranged in the optical module shown in FIG. 2A. A travelling direction of each light signal is indicated by an arrow in FIG. 2A.

As shown in FIG. 2A and FIG. 2B, a transmission-reception unity type of optical module comprises:

a for-transmission laser diode (LD) 2 (functioning as a laser beam transmitting means) for outputting a transmission-light signal of a 1.3 μm wavelength band;

a first optical fiber 3 for receiving a reception-light signal of a 1.5 μm wavelength band from an outside and transmitting the transmission-light signal output from the for-transmission LD 2 to the outside;

an optical waveguide 1, having a first end surface 1a facing on both the for-transmission laser diode 2 and an end 3a of the first optical fiber 3 and a second end surface 1b, for transmitting the transmission-light signal output from the for-transmission laser diode 2 and the reception-light signal output from the first optical fiber 3;

a second optical fiber 6 (functioning as a light transmitting means), of which a light incident end surface 6a faces on the second end surface 1b, for transmitting the reception-light signal output from the optical waveguide 1 and received from the light incident end surface 6a; and a for-reception photodiode (PD) 5 (functioning as a laser beam receiving means), facing on a light emitting end surface 6b of the second optical fiber 6, for detecting the reception-light signal output from the light emitting end surface 6b of the second optical fiber 6.

The optical waveguide 1 comprises:

a first core 12, of which a for-transmission LD side end 12a faces on the for-reception laser diode 2, for transmitting the transmission-light signal of the 1.3 μm wavelength band output from the for-transmission laser diode 2, the transmission-light signal having a first travelling direction characteristic corresponding to a direction (shown in FIG. 2A by a broken-line arrow) of a prolonged line of the first core 12 extending toward the other side end, and the direction of the prolonged line of the first core 12 differing from an extending direction of the second optical fiber 6;

a second core 13, of which a first optical fiber side end 13a faces on the first optical fiber 3 and of which the other end is connected with the other end of the first core 12 at a connection point 15 to form a V-shaped connection with the first core 12, for transmitting the reception-light signal received in the first optical fiber 3, the reception-light signal having a second travelling direction characteristic corresponding to a direction of a prolonged line of the second core 13 on the other side, and the direction of the prolonged line of the second core 13 agreeing with the extending direction of the second optical fiber 6;

a WDM filter 4 (functioning as a main filter), which is arranged in a groove formed in the optical waveguide 1 and on which the connection point 15 is positioned, for imperfectly reflecting the transmission-light signal transmitting through the first core 12 to the second core 13, which forms the V-shaped connection with the first core 12, to transmit the transmission-light signal to the outside through the second core 13 and the first optical fiber 3 and transmitting the reception-light signal of the second core 13 and a portion of the transmission-light signal of the first core 12, the first travelling direction characteristic of the portion of the transmission-light signal differing from the second travelling direction characteristic of the reception-light signal because of the V-shaped connection between the first and second cores 12 and 13 on the WDM filter 4;

a third core 14, of which a WDM filter side end 14a is placed on a light outputting side surface 4a of the WDM filter 4 and a for-reception PD side end 14b is connected with the second end surface 1b of the optical waveguide 1, for transmitting the reception-light signal and the portion of the transmission-light signal, which transmit through the WDM filter 4 and have the travelling direction characteristics different from each other, and sending only the- transmission-light signal, of which the travelling direction characteristic matches with the second optical fiber 6, to the second optical fiber 6;

a cladding body 16 surrounding the first core 12, the second core 13 and the third core 14 and contacting with the WDM filter 4; and a substrate 11 arranged under the cladding body 16 to support the first core 12, the second core 13, the third core 14, the WDM filter 4 and the cladding body 16.

The transmission-reception unity type of optical module further comprises:

a first transparent resin body 7a, filling up a space between the for-reception PD side end 14b of the third core 14 and the light incident end surface 6a of the second optical fiber 6, for transmitting the reception-light signal output from the third core 14 of the optical waveguide 1 to the second optical fiber 6 at a considerably low loss of the reception-light signal;

a second transparent resin body 7b, filling up a space between the light emitting end surface 6b of the second optical fiber 6 and the for-reception photodiode 5, for transmitting the reception-light signal output from the second optical fiber 6 to the for-reception photodiode 5 at a considerably low loss of the reception-light signal; and an opaque resin body 8, arranged in a space surrounding a light propagation route from the for-reception PD side end 14b of the third core 14 to the for-reception photodiode 5 through the first and second transparent resin bodies 7a and 7b and the second optical fiber 6, for preventing light transmitted from a surrounding area of the optical module and stray light transmitting through the optical waveguide 1 from being detected in the for-reception photodiode 5.

Areas of the WDM filter 4, the transparent resin bodies 7a and 7b and the opaque resin body 8 are hatched in FIG. 2A and FIG. 2B.

The first optical fiber 3 is made of a single-mode type optical fiber, and the second optical fiber 6 is made of a multi-mode type optical fiber. The second optical fiber 6 has a prescribed length to obtain a desired characteristic.

The connection point 15 of the first and second cores 12 and 13 is placed at the tip of a V-shaped portion formed by the first and second cores 12 and 13 and is placed at a mid point between the first and second end surfaces 1a and 1b of the optical waveguide 1. The for-transmission LD side end 12a of the first core 12 and the first optical fiber side end 13a of the second core 13 are placed on the first end surface 1a of the optical waveguide 1, and the for-reception PD side end 14b of the third core 14 is placed on the second end surface 1b of the optical waveguide 1. The for-reception PD side end 14b of the third core 14 denotes an output point at which the reception-light signal of the 1.5 $\mu$m wavelength band is output from the optical waveguide 1.

The for-transmission LD 2 is placed on a prolonged line of the LD side end 12a of the first core 12 and is positioned in the neighborhood of the LD side end 12a, so that the transmission-light signal emitted from the for-transmission LD 2 is smoothly sent to the first core 12 at a considerably low loss. The end 3a of the first optical fiber 3 is placed on a prolonged line of the fiber side end 13a of the second core 13 and is positioned in the neighborhood of the fiber side end 13a, the other end of the first optical fiber 3 is directed to the outside, so that the reception-light signal received from the outside in the first optical fiber 3 is smoothly sent to the second core 13 at a considerably low loss.

The WDM filter side end 14a of the third core 14 is placed on a prolonged line of the second core 13 extending toward the for-reception PD 5, and the light incident end surface 6a of the second optical fiber 6 is placed on a prolonged line of the third core 14 extending from the for-reception PD side end 14b toward the for-reception PD 5 and is positioned in the neighborhood of the for-reception PD side end 14b of the third core 14. Therefore, the reception-light signal transmitting through the second core 13 is smoothly sent to the third core 14 at a considerably low loss, and the reception-light signal having the second travelling direction characteristic is smoothly sent to the second optical fiber 6 at a considerably low loss.

The for-reception PD 5 is placed on a prolonged line of the light emitting end surface 6b of the second optical fiber 6 and is positioned in the neighborhood of the light emitting end surface 6b, so that the reception-light signal transmitting though the second optical fiber 6 is smoothly detected by the for-reception PD 5 at a considerably low loss.

The first and second transparent resin bodies 7a and 7b have the almost same refractive index as those of the cores 12, 13 and 14, so that the reception-light signal transmitting through the third core 14 is smoothly sent to the second optical fiber 6 at a considerably low loss. Also, the first and second transparent resin bodies 7a and 7b are transparent for the reception-light signal of the 1.5 $\mu$m wavelength band, so that the reception-light signal is not absorbed by the first and second transparent resin bodies 7a and 7b.

In the above configuration, an operation of the optical module is described.

A reception-light signal of the 1.5 $\mu$m wavelength band received from the outside in the first optical fiber 3 is sent from the end 3a of the first optical fiber 3 to the fiber side end 13a of the optical waveguide 1. In the optical waveguide 1, the reception-light signal transmits through the second core 13, transmits through the WDM filter 4 and transmits through the third core 14. Thereafter, the reception-light signal is sent from the PD side end 14b of the third core 14 to the end 6a of the second optical fiber 6. In this case, the reception-light signal has a second travelling direction characteristic corresponding to a direction of a prolonged line of the second core 13 toward a side of the WDM filter 4, so that the intensity of the reception-light signal becomes strongest in the direction of the prolonged line of the second core 13. Because this direction of the prolonged line of the second core 13 agrees with an extending direction of the second optical fiber 6 toward the optical waveguide 1, the reception-light signal having the second travelling direction characteristic can be easily coupled with the second optical fiber 6 and transmits through the first and second transparent resin bodies 7a and 7b and the second optical fiber 6. Therefore, the reception-light signal can be detected by the for-reception PD 5 at a low power loss.

Also, a transmission-light signal of the 1.3 $\mu$m wavelength band emitted from the for-transmission LD 2 is sent to the optical waveguide 1. In the optical waveguide 1, the transmission-light signal transmits through the first core 12, and a major portion of the transmission-light signal is reflected on the WDM filter 4 and transmits through the second core 13 in a direction opposite to that of the transmission of the reception-light signal. Thereafter, the major portion of the transmission-light signal is sent from the fiber side end 13a of the second core 13 to the end 3a of the first optical fiber 3 and transmits through the second optical fiber 3. Therefore, the transmission-light signal can be output to the outside from the first optical fiber 3.

Because the transmission-light signal is imperfectly reflected on the WDM filter 4, the remaining portion of the transmission-light signal transmits through the WDM filter 4 and transmits through the third core 14. In this case, the remaining portion of the transmission-light signal has a first travelling direction characteristic corresponding to a direction (shown in FIG. 2A by the broken-line arrow) of a prolonged line of the first core 12 extending toward the WDM filter 4, so that the intensity of the transmission-light signal becomes strongest in the direction of the prolonged line of the first core 12. Because the first core 12 and the second core 13 are connected to each other at the connection point 15 of the WDM filter 4 to form a V-shaped connection, the direction of the prolonged line of the first core 12 does not agree with the extending direction of the second optical fiber 6, so that the first travelling direction characteristic of the remaining portion of the transmission-light signal differs from the second travelling direction characteristic of the reception-light signal. Therefore, the intensity of the remaining portion of the transmission-light signal is very weak in the direction of the prolonged line of the third core 14 extending toward the WDM filter 4, so that a minor portion of the transmission-light signal transmits through the third core 14, the first transparent resin body 7a, the second optical fiber 6 and the second transparent resin body 7b. Thereafter, the minor portion of the transmission-light signal is detected in the for-reception PD 5.

Also, because all the remaining portion of the transmission-light signal does not transmit through the third core 14, the other minor portion of the transmission-light signal (the sum of the dominant portion and the minor portion agrees with the remaining portion of the transmission-light signal) transmitting through the WDM filter 4 transmits through the cladding body 16 and/or the substrate 11 of the optical waveguide 1 as stray light. However, because a travelling direction of the stray light generally differs from the extending direction of the second optical fiber 6, the stray light does not transmit through the second optical fiber 6 but is absorbed by the opaque resin body 8. Accordingly, stray light detected in the for-reception PD 5 can be considerably reduced.

Also, in cases where the optical module is arranged in a package, a portion of the transmission-light signal emitted from the for-transmission LD 2 is reflected on the package surface, so that the reflected light returns to the optical module. In this case, assuming that the opaque resin body 8 is not arranged in a space surrounding a light propagation route from the second end surface 1b of the optical waveguide 1 to the for-reception PD 5, the reflected light transmits through the light propagation route. Because the for-reception PD 5 has a sensitivity for light of the 1.3 μm wavelength band as well as light of the 1.5 μm wavelength band, there is a probability that the reflected light transmitting through the space surrounding the light propagation is undesirably detected in the for-reception PD 5. In this embodiment, because the space surrounding the light propagation route is covered with the opaque resin body 8, the reflected light transmitted from a surrounding area of the optical module is not detected in the for-reception PD 5.

Accordingly, because the direction of the prolonged line of the first core 12 on the side of the WDM filter 4 does not agree with the extending direction of the second optical fiber 6, the transmission of the transmission-light signal to the second optical fiber 6 can be reduced to a minimum, and the transmission of the stray light to the second optical fiber 6 can be prevented. Therefore, an optical cross-talk based on the mixing of the transmission-light signal with the reception-light signal can be reduced to a minimum, and an optical cross-talk based on the mixing of the stray light with the reception-light signal can be prevented.

Also, the space between the for-reception PD side end 14b of the third core 14 and the light incident end surface 6a of the second optical fiber 6 is filled up with the first transparent resin body 7a, the space between the light emitting end surface 6b of the second optical fiber 6 and the for-reception photodiode 5 is filled up with the second transparent resin body 7b, and the space surrounding the light propagation route from the for-reception PD side end 14b of the third core 14 to the for-reception photodiode 5 through the first and second transparent resin bodies 7a and 7b and the second optical fiber 6 is filled up with the opaque resin body 8. Therefore, the reception-light signal can be detected in the for-reception PD 5 at a considerably low loss while preventing the detection of the reflected light transmitted from a surrounding area of the optical module. Therefore, an optical cross-talk based on the mixing of the reflected light transmitted from the surrounding area with the reception-light signal can be prevented, so that an optical communication can be performed at a higher quality.

Also, because the second optical fiber 6 is made of a multi-mode type optical fiber, a precision of the positioning of the second optical fiber 6 for the optical waveguide 1 can be made loosened. That is, the assembling of the optical module can be made easy as compared with an optical module in which a single-mode type optical fiber is used as the second optical fiber 6.

Embodiment 3

FIG. 3A is an upper view of an optical configuration of a transmission-reception unity type of optical module according to a third embodiment of the present invention, and FIG. 3B is a side view of an optical waveguide arranged in the optical module shown in FIG. 3A. A travelling direction of each light signal is indicated by an arrow in FIG. 3A.

A configuration of an optical module different from that according to the second embodiment is described.

As shown in FIG. 3A and FIG. 3B, a supplementary WDM filter 41 is arranged on the second end surface 1b of the optical waveguide 1 through a transparent-resin layer 42. The supplementary WDM filter 41 has a function for reflecting the transmission-light signal of the 1.3 μm wavelength band and transmitting the reception-light signal of the 1.5 μm wavelength-band. A film type of supplementary WDM filter is attached as the supplementary WDM filter 41 on the second end surface 1b of the optical waveguide 1 by using a melted material of transparent resin as an adhesive. However, it is applicable that a material of the supplementary WDM filter 41 be deposited on the second end surface 1b of the optical waveguide 1.

Also, a space between a portion of a light emitting side surface 41a of the supplementary WDM filter 41 facing on the-PD side end 14b of the third core 14 and the light incident end 6a of the second optical fiber 6 is filled up with a first transparent resin body 43 to transmit the reception-light signal transmitting through the supplementary WDM filter 41 to the second optical fiber 6 at a considerably low loss. The transmission-light signal transmitting through the third core 14 is output from the PD side end 14b of the third core 14 to the portion of the light emitting side surface 41a of the supplementary WDM filter 41. The first transparent resin body 43 is used in place of the first transparent resin body 7a of the second embodiment.

Also, a space surrounding a light propagation route from the portion of the light emitting side surface 41a of the supplementary WDM filter 41 facing on the PD side end 14b of the third core 14 to the for-reception photodiode 5 through the first and second transparent resin bodies 43 and 7b and the second optical fiber 6 is filled up with an opaque resin body 44 to prevent stray light or light transmitted from an outside of the optical module transmitting through the light propagation route. The opaque resin body 44 is used in place of the opaque resin body 8 of the second embodiment.

Areas of the WDM filter 4, the transparent resin bodies 43 and 7b, the supplementary WDM filter 41, the transparent resin layer 42 and the opaque resin body 44 are hatched in FIG. 3A and FIG. 3B. The description of composing elements indicated by reference numerals, which are the same as those used in FIG. 2A and FIG. 2B, is omitted because the composing elements of FIG. 3A and FIG. 3B are the same as or equivalent to those of FIG. 2A and FIG. 2B indicated by the same reference numerals.

In the above configuration, the reception-light signal of the 1.5 μm wavelength band, which is received in the first optical fiber 3 and transmits through the third core 14, transmits through the supplementary WDM filter 41 and the second optical fiber 6, and the reception-light signal is detected by the for-reception PD 5.

In contrast, the transmission-light signal of the 1.3 μm wavelength band, which is emitted from the for-transmission LD 2 and transmits through the third core 14, is reflected on a surface of the supplementary WDM filter 41. Also, the stray light generated from the transmission-light signal is reflected on a surface of the supplementary WDM filter 41. Therefore, neither the transmission-light signal nor the stray light transmits through the second optical fiber 6.

Accordingly, because the supplementary WDM filter 41 is arranged on the second end surface 1b of the optical waveguide 1, the optical cross-talk based on the mixture of the transmission-light signal transmitting through the third core 14 with the reception-light signal can be prevented, and the optical cross-talk based on the mixture of the stray light with the reception-light signal can be moreover prevented.

Embodiment 4

FIG. 4 is a side view of an optical configuration of a transmission-reception unity type of optical module according to a fourth embodiment of the present invention. This side view is obtained by viewing the optical module from an X direction shown in FIG. 2A.

As shown in FIG. 4, a light shielding film 51 is arranged on the second end surface 1b of the optical waveguide 1 to shield the second optical fiber 6 and the for-reception PD 5 from the stray light transmitting through the cladding body 16 or the substrate 11. The light shielding film 51 is formed of a metallic film, and an area of the for-reception PD side end 14b of the third core 14 is not covered with the light shielding film 51.

To form the light shielding film 51, a metallic film is deposited on the entire area of the second end surface 1b, and a portion of the metallic film deposited on the for-reception PD side end 14b is etched. Also, it is applicable that a metallic film of a shielding pattern not covering the for-reception PD side end 14b be formed on the second end surface 1b of the optical waveguide 1.

The description of composing elements indicated by reference numerals, which are the same as those used in FIG. 2A and FIG. 2B, is omitted because the composing elements shown in FIG. 4 are the same as or equivalent to those of FIG. 2A and FIG. 2B indicated by the same reference numerals.

In the above configuration, not only the opaque resin body 8 shields the second optical fiber 6 and the for-reception PD 5 from the stray light transmitting through the cladding body 16 or the substrate 11, but also the light shielding film 51 shields the second optical fiber 6 and the for-reception PD 5 from the stray light transmitting through the cladding body 16 or the substrate 11.

Accordingly, because the light shielding film 51 is arranged on the second end surface 1b of the optical waveguide 1 except for the for-reception PD side end 14b of the third core 14, there is no probability that the stray light transmitting through the cladding body 16 or the substrate 11 transmits through the second optical fiber 6 to be detected by the for-reception PD 5 or is directly detected by the for-reception PD 5. Therefore, an optical cross-talk based on the mixing of the stray light with the reception-light signal can be prevented, so that an optical communication can be performed at higher quality.

In this embodiment, the light shielding film 51 is arranged on the second end surface 1b of the optical waveguide 1 except for the for-reception PD side end 14b of the third core 14. However, it is applicable that the light shielding film 51 be arranged on the light outputting side surface 4a of the WDM filter 4 except for an area corresponding to the connection point 15 of the first and second cores 12 and 13. Also, it is applicable that the light shielding film 51 be arranged on the light outputting side surface 24a of the WDM filter 24 except for an area corresponding to the connection point 34 of the first and second cores 32 and 33. Also, it is applicable that the light shielding film 51 be arranged on the light emitting side surface 41a of the supplementary WDM filter 41 except for an area corresponding to the for-reception PD side end 14b of the third core 14.

Embodiment 5

Figure 5:
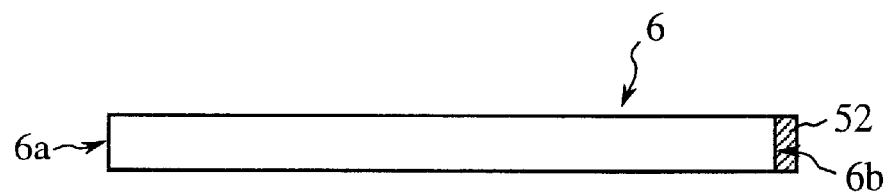
FIG. 5 is a side view of a second optical fiber of the optical module shown in FIG. 2A according to a fifth embodiment of the present invention.

FIG. 5 is a side view of the second optical fiber 6 used in the optical module shown in FIG. 1A or FIG. 2A according to a fifth embodiment of the present invention.

As shown in FIG. 5, a supplementary WDM filter 52 having a function for reflecting the transmission-light signal of the 1.3 μm wavelength band and transmitting the reception-light signal of the 1.5 μm wavelength band is arranged on the light emitting end surface 6b of the second optical fiber 26 (or 6). The supplementary WDM filter 52 is formed by depositing a material of the supplementary WDM filter 52 on the light emitting end surface 26b (or 6b). An area of the supplementary WDM filter 52 is hatched in FIG. 5.

In the above configuration, the reception-light signal of the 1.5 μm wavelength band, which is received in the first optical fiber 3 and transmits through the third core 14 (for only the case of FIG. 2A), transmits through the second optical fiber 26 (or 6) and the supplementary WDM filter 52 at a considerably low loss, and the reception-light signal is detected by the for-reception PD 25 (or 5).

In contrast, even though the transmission-light signal of the 1.3 μm wavelength band, which is emitted from the for-transmission LD 2 and transmits through the third core 14, transmits through the second optical fiber 26 (or 6), the transmission-light signal is reflected on a surface of the supplementary WDM filter 52, so that the transmission-light signal is not detected by the for-reception PD 25 (or 5).

An experiment performed by the inventors according to the fifth embodiment on the basis of FIG. 1A is described. The first and second cores 32 and 33 are symmetric with respect to a line which passes through the connection point 34 and is perpendicular to the WDM filter 4, an angle between the first core 32 (and the second core 33) and the perpendicular line is 10 degrees. An angle between the perpendicular line and the extending direction of the second optical fiber 26 is called a fiber angle. As the fiber angle is increased, an angle between a direction of a prolonged line of the first core 32 and the extending direction of the second optical fiber 26 is increased. For example, in cases where the fiber angle is set to 10 degrees, a direction of a prolonged line of the second core 33 agrees with the extending direction of the second optical fiber 26. The relationship between the fiber angle (degree) and the reduction of an optical cross-talk (dB unit) is shown in Table 1.

TABLE 1

| fiber angle | 5 | 10 | 15 | 17 | 20 |
|---|---|---|---|---|---|
| Reduction of optical cross-talk | 61.1 | 62.0 | 63.0 | 63.5 | 64.0 |

In this experimental result, an angle between the direction of a prolonged line of the first core 12 and the extending direction of the second optical fiber 26 is 15 degrees for the fiber angle 5 degrees and is 30 degrees for the fiber angle 20 degrees.

Accordingly, because the supplementary WDM filter 52 is arranged on the light emitting end surface 6b of the second optical fiber 6, the optical cross-talk based on the mixing of the transmission-light signal with the reception-light signal can be prevented, so that an optical communication can be performed at a higher quality such as reduction of an optical cross-talk of 60 dB or more.

In this embodiment, the supplementary WDM filter 52 is arranged on the light emitting end surface 6b of the second optical fiber 6. However, it is applicable that the supplementary WDM filter 52 be arranged on the light incident end surface 6a of the second optical fiber 6. Also, it is applicable that the supplementary WDM filter 52 be arranged on the light emitting end surface 26b of the second optical fiber 26. Also, it is applicable that the supplementary WDM filter 52 be arranged on the light incident end surface 26a of the second optical fiber 26.

Embodiment 6

Figure 6:
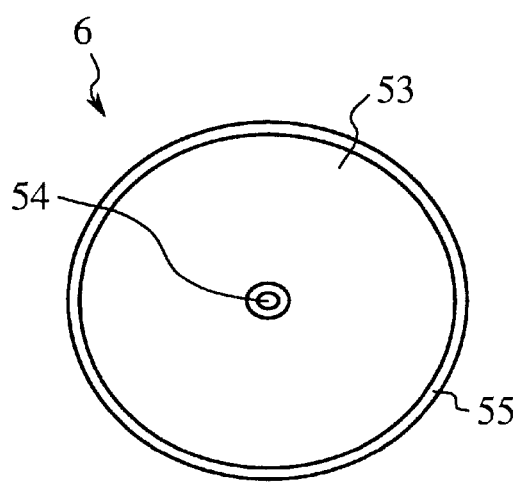
FIG. 6 is a front view of the second optical fiber of the optical module shown in FIG. 2A according to a sixth embodiment of the present invention.

FIG. 6 is a front view of the second optical fiber 6 used in the optical module shown in FIG. 2A according to a sixth embodiment of the present invention. This front view is obtained by viewing the optical module from a Y direction shown in FIG. 2A.

As shown in FIG. 6, the second optical fiber 6 comprises a core portion 54 placed in the center of the fiber 6 and a cladding portion 55 surrounding the core portion 54, and a light shielding film 53 is arranged on the cladding portion 55 placed on a side of the light emitting end surface 6b of the second optical fiber 6 to shield the for-reception PD 5 from light transmitting through the cladding portion 55 of the optical fiber 6. To form the light shielding film 53, a material of the light shielding film 53 is deposited on the light emitting end surface 6b of the second optical fiber 6, and a portion of the deposited material placed on the core portion 54 is etched to remove the portion of the deposited material. Also, it is applicable that a material of the light shielding film 53 be deposited on the light emitting end surface 6b of the second optical fiber 6 to form a patterned film not covering the core portion 54.

In the above configuration, even though the reception-light signal of the 1.5 μm wavelength band transmits through the cladding portion 55 of the optical fiber 6, the light shielding film 53 prevents the light transmitting through the cladding portion 55 from being detected by the for-reception PD 5.

Accordingly, because the light shielding film 53 is arranged on the cladding portion 55 placed on the side of the light emitting end surface 6b of the second optical fiber 6, the light transmitting through the cladding portion 55 is not detected by the for-reception PD 5. Therefore, an optical cross-talk based on the mixing of the light transmitting through the cladding portion 55 with the reception-light signal can be prevented, so that an optical communication can be performed at higher quality.

Embodiment 7

In this embodiment, a light transmitting means is not embodied by the second optical fiber 6 used in the second embodiment but embodied by an optical waveguide.

FIG. 7A is an upper view showing an optical configuration of a transmission-reception unity type of optical module according to a seventh embodiment of the present invention, and FIG. 7B is a side view of a second optical waveguide arranged in the optical module shown in FIG. 7A. This side view is obtained by viewing the optical module from a Z direction shown in FIG. 7A. A travelling direction of each light signal is indicated by an arrow in FIG. 7A.

As shown in FIG. 7A, a transmission-reception unity type of optical module comprises:

the first optical fiber 3; the for-transmission laser diode 2;
a first optical waveguide 61 having the same configuration and function as those in the optical waveguide 1 shown in FIG. 2A;
a second optical waveguide 62 (functioning as a light transmitting means), formed of a multi-mode optical waveguide and having a prescribed length to obtain a desired characteristic, for transmitting the reception-light signal output from the first optical waveguide 61; and
the for-reception PD 5.

As shown in FIG. 7A and FIG. 7B, the second optical waveguide 62 comprises:

a core 64, of which a first optical waveguide side end 64a faces on the for-reception PD side end 14b and of which a for-reception PD side end 64b faces on the for-reception PD 5, for transmitting the reception-light signal of the 1.5 μm wavelength band output from the third core 14 of the first optical waveguide 61;
a cladding body 65 surrounding the core 64; and
a substrate 63 supporting the core 64 and the cladding body 65.

The transmission-reception unity type of optical module further comprises:

a first transparent resin body 66a, filling up a space between the for-reception PD side end 14b of the third core 14 and the first optical waveguide side end 64a of the core 64 placed on a light incident end surface 62a of the second optical waveguide 62, for transmitting the reception-light signal output from the first optical waveguide 61 to the second optical waveguide 62 at a considerably low loss of the reception-light signal;
a second transparent resin body 66b, filling up a space between the for-reception PD side end 64b of the core 64 placed on a light emitting end surface 62b of the second optical waveguide 62 and the for-reception PD 5, for transmitting the reception-light signal output from the core 64 of the second optical waveguide 62 to the for-reception PD 5 at a considerably low loss of the reception-light signal; and
an opaque resin body 67, arranged in a space surrounding a light propagation route from the for-reception PD side end 14b of the third core 14 to the for-reception PD 5, for preventing light transmitted from a surrounding area of the optical module and stray light transmitting through the optical waveguides 61 and 62 from being detected in the for-reception PD 5.

The first optical waveguide side end 64a of the core 64 of the second optical waveguide 62 is placed on a prolonged line of the third core 14 extending toward the second optical waveguide 62 and is positioned in the neighborhood of the for-reception PD side end 14b of the third core 14. The for-reception PD side end 64b of the core 64 of the second optical waveguide 62 is positioned in the neighborhood of the for-reception PD 5. The for-reception PD 5 is placed on a prolonged line of the core 64 of the second optical waveguide 62.

Areas of the WDM filter 4, the transparent resin bodies 66a and 66b and the opaque resin body 67 are hatched in FIG. 7A.

In the above configuration, an operation of the transmission-reception unity type of optical module is described.

A reception-light signal of the 1.5 μm wavelength band received from the outside in the first optical fiber 3 transmits through the first optical waveguide 61 in the same manner as in the second embodiment. Thereafter, the reception-light signal is sent from the PD side end 14b of the third core 14 to the first optical waveguide side end 64a of the core 64. In this case, the reception-light signal has a travelling direction characteristic corresponding to a direction of a prolonged line of the third core 14 extending toward the for-reception PD side end 14b of the third core 14, so that the intensity of the reception-light signal becomes strongest in the direction of the prolonged line of the third core 14. Because this direction of the prolonged line of the third core 14 agrees with an extending direction of the core 64 of the second optical waveguide 62 toward the first optical waveguide 61, the reception-light signal having the travelling direction characteristic can be easily coupled with the second optical waveguide 62 and transmits through the core 64 of the second optical waveguide 62. Therefore, the reception-light signal can be detected by the for-reception PD 5 at a low power loss.

Also, a transmission-light signal of the 1.3 μm wavelength band emitted from the for-transmission LD 2 is sent to the second optical waveguide 61 and transmits through the first core 12. Thereafter, a major portion of the transmission-light signal is reflected on the WDM filter 4 and is output to the outside from the first optical fiber 3 in the same manner as in the second embodiment.

Because the transmission-light signal is imperfectly reflected on the WDM filter 4, the remaining portion of the transmission-light signal transmits through the WDM filter 4 and transmits through the third core 14. In this case, because the remaining portion of the transmission-light signal has a first travelling direction characteristic corresponding to a direction, (shown by a broken-line arrow in FIG. 7A) of a prolonged line of the first core 12 extending toward a side of the WDM filter 4, a minor portion of the transmission-light signal transmits through the third core 14 in the same manner as in the second embodiment. Because the first optical waveguide side end 64a of the core 64 of the second optical waveguide 62 is placed on a prolonged line of the third core 14 extending toward the second optical waveguide 62, the minor portion of the transmission-light signal transmits through the first transparent resin body 64a and the core 64 of the second optical waveguide 62. Thereafter, the minor portion of the transmission-light signal is detected in the for-reception PD 5.

Also, because all the remaining portion of the transmission-light signal does not transmit through the third core 14, the other minor portion of the transmission-light signal (the sum of the dominant portion and the minor portion agrees with the remaining portion of the transmission-light signal) transmitting through the WDM filter 4 transmits through the cladding body 16 and/or the substrate 11 of the optical waveguide 1 as stray light. However, because a travelling direction of the stray light generally differs from the extending direction of the second optical fiber 6, the stray light does not transmit through the core 64 of the second optical waveguide 62 but is absorbed by the opaque resin body 67. Accordingly, stray light detected in the for-reception PD 5 can be considerably reduced.

Also, even though the optical module is arranged in a package to make the reflected light returns to the optical module in the same manner in the second embodiment, because the space surrounding the light propagation route is covered with the opaque resin body 67, the reflected light transmitted from a surrounding area of the optical module is not detected in the for-reception PD 5.

Accordingly, because the direction of the prolonged line of the first core 12 on the side of the WDM filter 4 does not agree with the extending direction of the second optical fiber 6, the transmission of the transmission-light signal to the core 64 of the second optical waveguide 62 can be reduced to a minimum, and the transmission of the stray light to the core 64 of the second optical waveguide 62 can be prevented. Therefore, an optical cross-talk based on the mixing of the transmission-light signal with the reception-light signal can be reduced to a minimum, and an optical cross-talk based on the mixing of the stray light with the reception-light signal can be prevented.

Also, the space between the for-reception PD side end 14b of the third core 14 and the first optical waveguide side end 64a of the core 64 is filled up with the first transparent resin body 66a, the space between the for-reception PD side end 64b of the core 64 and the for-reception PD 5 is filled up with the second transparent resin body 66b, and the space surrounding the light propagation route from the for-reception PD side end 14b of the third core 14 to the for-reception PD 5 through the second optical waveguide 62 is filled up with the opaque resin body 67. Therefore, the reception-light signal can be detected in the for-reception PD 5 at a considerably low loss while preventing the detection of the stray light or the reflected light transmitted from a surrounding area of the optical module. Therefore, an optical cross-talk based on the mixing of the stray light or the light transmitted from the surrounding area with the reception-light signal can be prevented, so that an optical communication can be performed at a higher quality.

Also, because the second optical waveguide 62 is made of a multi-mode type optical waveguide, a precision of the positioning of the second optical waveguide 26 for the first optical waveguide 61 can be made loosened. That is, the assembling of the optical module can be made easy as compared with an optical module in which a single-mode type optical waveguide is used as the second optical waveguide 26.

Embodiment 8

In this embodiment, a light transmitting means is not embodied by the second optical fiber 26 used in the first embodiment but embodied by an optical waveguide.

Figure 8A:
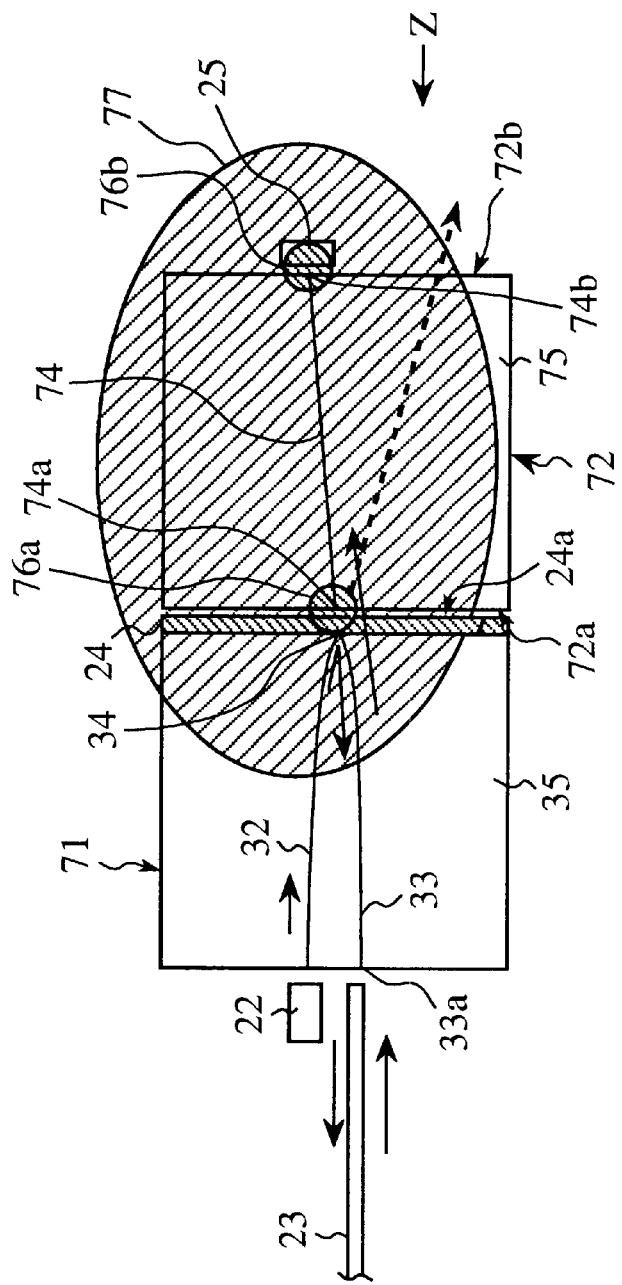
FIG. 8A is an upper view showing an optical configuration of a transmission-reception unity type of optical module according to an eighth embodiment of the present invention.

FIG. 8A is an upper view showing an optical configuration of a transmission-reception unity type of optical module according to an eighth embodiment of the present invention, and FIG. 18B is a side view of a second optical waveguide arranged in the optical module shown in FIG. 8A. This side view is obtained by viewing the optical module from a Z direction shown in FIG. 8A. A travelling direction of each light signal is indicated by an arrow in FIG. 8A.

As shown in FIG. 8A, a transmission-reception unity type of optical module comprises:

the first optical fiber 23; the for-transmission laser diode 22;

a first optical waveguide 71 having the same configuration and function as those in the optical waveguide 21 shown in FIG. 1A;

a second optical waveguide 72 (functioning as a light transmitting means), having a light incident end surface 72a and a light emitting end surface 72b, for transmitting the reception-light signal, which is output from the first optical waveguide 71 and is received on the light incident end surface 72a, to the light emitting end surface 72b; and the for-reception PD 5.

The second optical waveguide 72 is formed of a multi-mode optical waveguide and has a-prescribed length to obtain a desired characteristic.

Figure 8B:
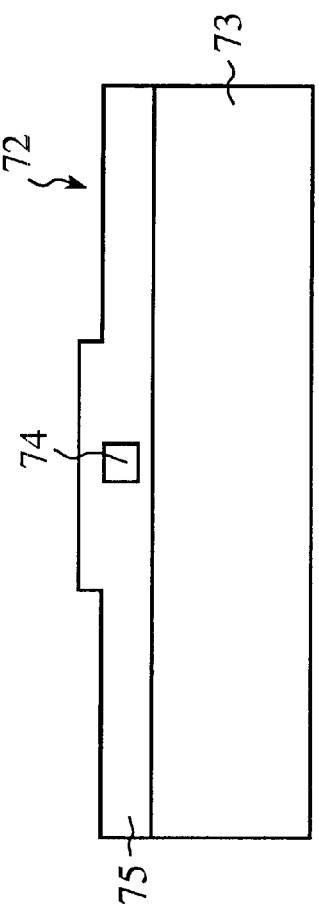
FIG. 8B is a side view of a second optical waveguide arranged in the optical module shown in FIG. 8A.

As shown in FIG. 8A and FIG. 8B, the second optical waveguide 72 comprises:

a core 74, of which a first optical waveguide side end 74a placed on the light incident end surface 72a faces on a portion of the light outputting side surface 24a corresponding to the connection point 34 between the first and second cores 32 and 33 and of which a for-reception PD side end 74b placed on the light emitting end surface 72b faces on the for-reception PD 5, for transmitting the reception-light signal of the 1.5 μm wavelength band output from the second core 33 of the first optical waveguide 71;

a cladding body 75 surrounding the core 74; and a substrate 73 supporting the core 74 and the cladding body 75.

The transmission-reception unity type of optical module further comprises:

a first transparent resin body 76a, filling up a space between the portion of the light outputting side surface 24a corresponding to the connection point 34 between the first and second cores 32 and 33 and the first optical waveguide side end 74a of the core 74 of the second optical waveguide 72, for transmitting the reception-light signal output from the first optical waveguide 71 to the second optical waveguide 72 at a considerably low loss of the reception-light signal;

a second transparent resin body 76b, filling up a space between the for-reception PD side end 74b of the core 74 of the second optical waveguide 72 and the for-reception PD 5, for transmitting the reception-light signal output from the core 74 of the second optical waveguide 72 to the for-reception PD 5 at a considerably low loss of the reception-light signal; and an opaque resin body 77, arranged in a space surrounding a light propagation route from the portion of the light outputting side surface 24a corresponding to the connection point 34 between the first and second cores 32 and 33 to the for-reception PD 5, for preventing light transmitted from a surrounding area of the optical module and stray light transmitting through the optical waveguides 71 and 72 from being detected in the for-reception PD 5.

The first optical waveguide-side end 74a of the core 74 of the second optical waveguide 72 is placed on a prolonged line of the second core 33 extended toward the WDM filter 24 and is positioned in the neighborhood of the connection point 34 between the first and second cores 32 and 33. The for-reception PD side end 74b of the core 74 of the second optical waveguide 72 is positioned in the neighborhood of the for-reception PD 5. The for-reception PD 5 is placed on a prolonged line of the core 74 of the second optical waveguide 72.

Areas of the WDM filter 24, the transparent resin bodies 76a and 76b and the opaque resin body 77 are hatched in FIG. 8A.

In the above configuration, an operation of the transmission-reception unity type of optical module is described.

A reception-light signal of the 1.5 μm wavelength band received from the outside in the first optical fiber 23 transmits through the first optical waveguide 71 in the same manner as in the first embodiment. Thereafter, the reception-light signal is sent from the connection point 34 placed on the WDM filter 24 to the first optical waveguide side end 74a of the core 74 of the second optical waveguide 72 while passing through the WDM filter 24. In this case, the reception-light signal has a second travelling direction characteristic corresponding to a direction of a prolonged line of the second core 33 toward a side of the WDM filter 24, so that the intensity of the reception-light signal becomes strongest in the direction of the prolonged line of the second core 33. Because this direction of the prolonged line of the second core 33 agrees with an extending direction of the core 74 of the second optical waveguide 72, the reception-light signal having the second travelling direction characteristic can be easily coupled with the core 74 of the second optical waveguide 72 and transmits through the core 74 of the second optical waveguide 72. Therefore, the reception-light signal can be detected by the for-reception PD 25 at a low power loss.

Also, a transmission-light signal of the 1.3 μm wavelength band emitted from the for-transmission LD 22 is sent to the first optical waveguide 71 and transmits through the first core 32. Thereafter, a major portion of the transmission-light signal is reflected on the WDM filter 24 and is output to the outside from the first optical fiber 23 in the same manner as in the first embodiment.

Because the transmission-light signal is imperfectly reflected on the WDM filter 24, the remaining portion of the transmission-light signal transmits through the WDM filter 24 and is output to an outside of the optical waveguide 71. In this case, the remaining portion of the transmission-light signal has a first travelling direction characteristic corresponding to a direction (shown by a broken-line. arrow in FIG. 8A) of a prolonged line of the first core 32 toward a side of the WDM filter 24, so that the intensity of the transmission-light signal becomes strongest in the direction of the prolonged line of the first core 32. Because the first core 32 and the second core 33 are connected to each other at the connection point 34 of the WDM filter 24 to form a V-shaped connection, the direction of the prolonged line of the first core 32 does not agree with the extending direction of the core 74 of the second optical waveguide 72, so that the first travelling direction characteristic of the remaining portion of the transmission-light signal differs from the second travelling direction characteristic of the reception-light signal. Therefore, the intensity of the remaining portion of the transmission-light signal is very weak in the extending direction of the core 74 of the second optical waveguide 72, the remaining portion of the transmission-light signal output to the outside of the optical waveguide 21 is not coupled to the core 74 of the second optical waveguide 72, so that the remaining portion of the transmission-light signal does not transmit through the core 74 of the second optical waveguide 72. Accordingly, no transmission-light signal is detected in the for-reception PD 25.

Also, because the remaining portion of the transmission-light signal does not transmit through the core 74 of the second optical waveguide 72, the remaining portion of the transmission-light signal transmits through the cladding body 75 and/or the substrate 73 of the second optical waveguide 72 as stray light. However, because a travelling direction of the stray light generally differs from the extending direction of the core 74 of the second optical waveguide 72 toward the for-reception PD 25, the stray light is absorbed by the opaque resin body 77. Accordingly, stray light detected in the for-reception PD 25 can be considerably reduced.

Also, in cases where the optical module is arranged in a package to form the reflected light in the same manner as in the first embodiment, because the space surrounding the light propagation route from the portion of the light outputting side surface 24a corresponding to the connection point 34 between the first and second cores 32 and 33 to the for-reception PD 5 is covered with the opaque resin body 77, the reflected light transmitted from a surrounding area of the optical module is not detected in the for-reception PD 25.

Accordingly, because the direction of the prolonged line of the first core 32 on the side of the WDM filter 24 does not agree with the extending direction of the core 74 of the second optical waveguide 72, the transmission of the transmission-light signal to the core 74 of the second optical waveguide 72 can be prevented, so that light other than the reception-light signal is not detected in the for-reception PD 25. Therefore, an optical cross-talk based on the mixing of the transmission-light signal with the reception-light signal can be prevented can be prevented.

Also, the space between the portion of the light outputting side surface 24a corresponding to the connection point 34 between the first and second cores 32 and 33 and the first optical waveguide side end 74a of the core 74 of the second optical waveguide 72 is filled up with the first transparent resin body 76a, the space between the for-reception PD side end 74b of the core 74 of the second optical waveguide 72 and the for-reception PD 5 is filled up with the second transparent resin body 76b, and the space surrounding the light propagation route from the portion of the light outputting side surface 24a corresponding to the connection point 34 between the first and second cores 32 and 33 to the for-reception PD 5 is filled up with the opaque resin body 77. Therefore, the reception-light signal can be detected in the for-reception PD 25 at a considerably low loss while preventing the detection of the stray light and the reflected light transmitted from a surrounding area of the optical module. Therefore, an optical cross-talk based on the mixing of the stray light with the reception-light signal can be prevented, an optical cross-talk based on the mixing of the reflected light with the reception-light signal can be prevented, and an optical communication can be performed at a higher quality.

Also, because the second optical waveguide 72 is made of a multi-mode type optical waveguide, a precision of the positioning of the second optical waveguide 72 for the first optical waveguide 71 can be made loosened. That is, the assembling of the optical module can be made easy as compared with an optical module in which a single-mode type optical waveguide is used as the second optical waveguide 72.

Embodiment 9

In this embodiment, the second optical waveguide 62 or 72 is deformed.

Figure 9:
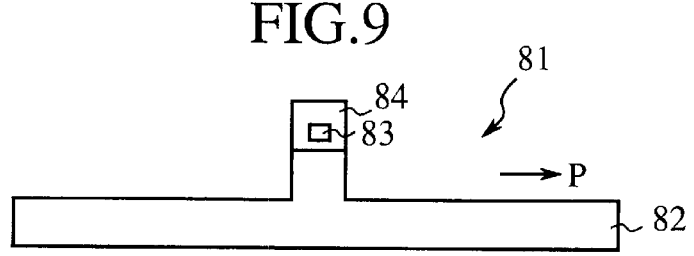
FIG. 9 is a side view of a transmission-reception unity type of optical module according to a ninth embodiment of the present invention.

FIG. 9 is a side view of a transmission-reception unity type of optical module according to a ninth embodiment of the present invention. This side view is obtained by viewing the optical module from a Z direction shown in FIG. 7 or FIG. 8.

A transmission-reception unity type of optical module comprises the for-transmission LD 2 (or 22), the first optical fiber 3 (or 23), the first optical waveguide 61 (or 71), a second a second optical waveguide 81 (a light transmitting means) obtained by deforming the cladding body 65 (or 75) of the second optical waveguide 62 (or 72), the for-reception PD 5 (or 25), the first and second transparent resin bodies 66a and 66b (or 76a and 76b), and the opaque resin body 67 (or 77).

As shown in FIG. 9, the second optical waveguide 81 comprises:
  a substrate 82 having a rectangular parallelepiped projected on a main portion;
  a cladding body 84 which is placed on the rectangular parallelepiped of the substrate 82 and has a short width in a P direction perpendicular to an axial direction of. the rectangular parallelepiped and parallel to an upper surface of the main portion of the substrate 82; and
  a core 83, surrounded by the cladding body 84, for transmitting the reception-light signal of the 1.5 μm wavelength band output from the third core 14 of the first optical waveguide 62 (or the second core 33 of the first optical waveguide 72).

In the above configuration, a volume of the cladding body 84 is considerably smaller than that of the cladding body 65 (or 75). Therefore, stray light transmitting through the cladding body 84 is considerably reduced as compared with that in the seventh (or eighth) embodiment.

Accordingly, because the volume of the cladding body 84 is considerably small, an optical cross-talk based on the mixing of the stray light with the reception-light signal can be moreover reduced.

Embodiment 10

Figure 10:
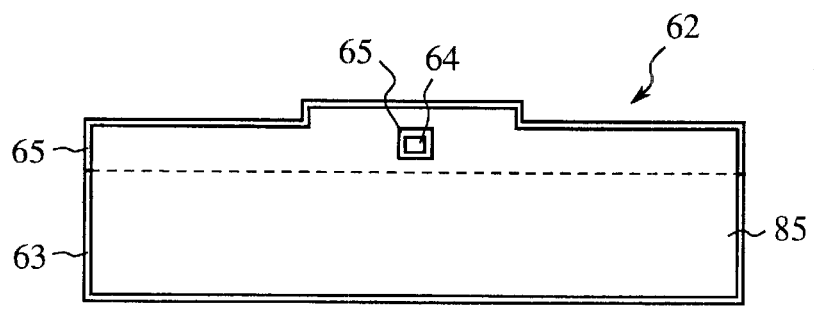
FIG. 10 is a side view of an optical configuration of a transmission-reception unity type of optical module according to a tenth embodiment of the present invention.
Figure 11:
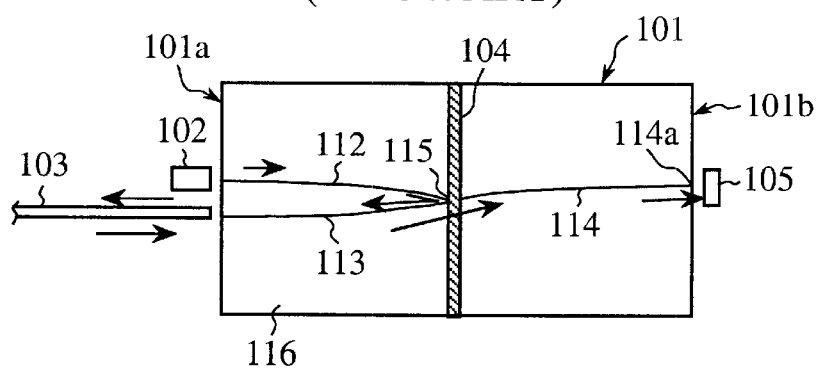
FIG. 11 is an upper view showing an optical configuration of a transmission-reception unity type of optical module corresponding to a first prior art.
Figure 12:
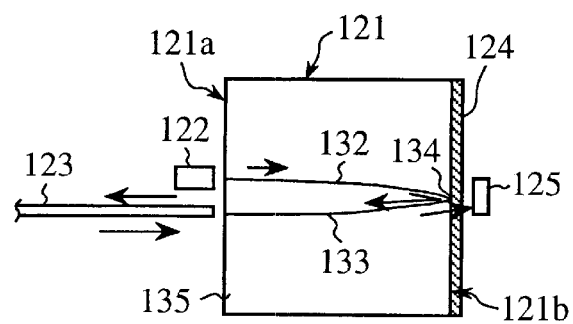
FIG. 12 is an upper view showing an optical configuration of a transmission-reception unity type of optical module corresponding to a second prior art.

FIG. 10 is a side view of an optical configuration of a transmission-reception unity type of optical module according to a tenth embodiment of the present invention. This side view is obtained by viewing the optical module from the Z direction shown in FIG. 7A.

As shown in FIG. 10, a light shielding film 85 is arranged on the light emitting end surface 62b of the second optical waveguide 62 to shield the for-reception PD 5 from the stray light transmitting through the cladding body 65 or the substrate 63 of the second optical waveguide 62. The light shielding film 85 is formed of a metallic film, and an area of the core 64 is not covered with the light shielding film 85.

To form the light shielding film 85, a metallic film is deposited on the entire area of the light emitting end surface 62b of the second optical waveguide 62, and a portion of the metallic film deposited on the core 64 is etched. Also, it is applicable that a metallic film of a shielding pattern not covering the core 64 be formed on the light emitting end surface 62b of the second optical waveguide 62.

In the above configuration, not only the opaque resin body 67 shields the for-reception PD 5 from the stray light transmitting through the cladding body 65 or the substrate 63, but also the light shielding film 85 shields the for-reception PD 5 from the stray light transmitting through the cladding body 65 or the substrate 63.

Accordingly, because the light shielding film 85 is arranged on the light emitting end surface 62b of the second optical waveguide 62 except for the area of the core 64, there is no probability that the stray light transmitting through the cladding body 65 or the substrate 63 is detected by the for-reception PD 5. Therefore, an optical cross-talk based on the mixing of the stray light with the reception-light signal can be prevented, so that an optical communication can be performed at higher quality.

In this embodiment, the light shielding film 85 is arranged on the light emitting end surface 62b of the second optical waveguide 62 except for the area of the core 64. However, it is applicable that the light shielding film 85 be arranged on the light emitting end surface 72b of the second optical waveguide 72 except for the area of the core 74.

What is claimed is:

1. An optical module comprising:
  transmission-light signal emitting means for emitting a transmission-light signal having a first wavelength band;
  an optical fiber for receiving a reception-light signal having a second wavelength band from an outside and transmitting the transmission-light signal emitted from the transmission-light signal emitting means;
  an optical waveguide for transmitting the transmission-light signal emitted from the transmission-light signal emitting means and the reception-light signal received by the optical fiber, giving a first travelling direction characteristic corresponding to a first direction to the reception-light signal and outputting the transmission-light signal to the optical fiber to transmit the transmission-light signal to the outside;
  light transmitting means for receiving the reception-light signal having the first travelling direction characteristic from the optical waveguide and transmitting the reception-light signal; and reception-light signal detecting means for detecting the reception-light signal transmitting through the light transmitting means, wherein the optical waveguide comprises a first core, having a first end facing the transmission-light signal emitting means and a second end extending in a second direction differing from the first direction, for transmitting the transmission-light signal received at the first end, giving a second travelling direction characteristic corresponding to the second direction to the transmission-light signal and outputting the transmission-light signal from the second end;

a second core, connected with the second end of the first core at a connection point, for transmitting the reception-light signal; and a main filter, on which the connection point is placed, for reflecting a major portion of the transmission-light signal received at the connection point from the first core to the second core to output the major portion of the transmission-light signal from the optical fiber to the outside, transmitting the remaining portion of the transmission-light signal received at the connection point from the first core and the reception-light signal received at the connection point from the second core and sending the reception-light signal of the first travelling direction characteristic to the light transmitting means to make the reception-light signal detecting means detect the reception-light signal, while preventing the remaining portion of the transmission-light signal of the second travelling direction characteristic from being sent to the light transmitting means.

2. An optical module according to claim 1, wherein the optical waveguide further comprises a third core for receiving a minor portion of the transmission-light signal from the remaining portion of the transmission-light signal transmitting through the main filter, receiving the reception-light signal transmitting through the main filter and transmitting the minor portion of the transmission-light signal and the reception-light signal, the reception-light signal being sent to the light transmitting means to make the reception-light signal detecting means detect the reception-light signal while preventing the other minor portion of the transmission-light signal, which is obtained from the remaining portion of the transmission-light signal and is not received by the third core, from being sent to the light transmitting means.

3. An optical module according to claim 2, further comprising:

a light shielding film, arranged on a light emitting end surface of the optical waveguide except for an area of the third core, for shielding the light transmitting means and the reception-light signal detecting means from stray light transmitting through an area of the optical waveguide other than the third core.

4. An optical module according to claim 2, further comprising:

a light shielding film, arranged on a light emitting surface of the main filter except for a portion corresponding to the connection point of the first and second cores, for shielding the light transmitting means and the reception-light signal detecting means from stray light transmitting through the optical waveguide other than the first and second cores.

5. An optical module according to claim 2, further comprising:

a supplementary filter, arranged on an end surface of the optical waveguide facing the light transmitting means, for reflecting the minor portion of the transmission-light signal transmitting through the third core of the optical waveguide and transmitting the reception-light signal transmitting through the third core of the optical waveguide.

6. An optical module according to claim 5, further comprising:

a first transparent resin body, filling up a space from a light emitting point of the supplementary filter to a light incident end of the light transmitting means, for transmitting the reception-light signal output from the light emitting point of the supplementary filter to the light incident end of the light transmitting means;

a second transparent resin body, filling up a space from a light emitting end of the light transmitting means to the reception-light signal detecting means, for transmitting the reception-light signal output from the light emitting end of the light transmitting means to the reception-light signal detecting means; and an opaque resin body, arranged in a space surrounding a light propagation route from the light emitting point of the supplementary filter to the reception-light signal detecting means through the light transmitting means, for preventing light transmitted from a surrounding area of the optical module or stray light transmitting through the optical waveguide from being detected by the reception-light signal detecting means.

7. An optical module according to claim 5, further comprising:

a light shielding film, arranged on a light emitting surface of the supplementary filter except for a portion corresponding to the third core of the optical waveguide, for shielding the light transmitting means and the reception-light signal detecting means from stray light transmitting through the optical waveguide other than the third core.

8. An optical module according to claim 7, further comprising:

a light shielding film, arranged on a light emitting surface of the main filter except for a portion corresponding to the connection point of the first and second cores, for shielding the light transmitting means and the reception-light signal detecting means from stray light transmitting through the optical waveguide.

9. An optical module according to claim 1, wherein the second core extends in the first direction at the connection point to give the first travelling direction characteristic corresponding to the first direction to the reception-light signal in the second core.

10. An optical module according to claim 1, further comprising:

a first transparent resin body, filling up a space from a light emitting point placed on the main filter of the optical waveguide to a light incident end of the light transmitting means, for transmitting the reception-light signal output from the light emitting point of the main filter to the light incident end of the light transmitting means;

a second transparent resin body, filling up a space from a light emitting end of the light transmitting means to the reception-light signal detecting means, for transmitting the reception-light signal output from the light emitting end of the light transmitting means to the reception-light signal detecting means; and an opaque resin body, arranged in a space surrounding a light propagation route from the light emitting points of the main filter to the reception-light signal detecting means through the light transmitting means, for preventing light transmitted from a surrounding area of the optical module or stray light transmitting through the optical waveguide from being detected by the reception-light signal detecting means.

11. An optical module according to claim 1, wherein the connection point of the first and second cores is placed on an end surface of the optical waveguide opposite to a light incident end surface of the optical waveguide, the transmission-light signal emitted from the transmission-light signal emitting means and the reception-light signal received by the optical fiber being incident on the light incident end surface of the optical waveguide.

12. An optical module according to claim 11, further comprising:

a first transparent resin body, filling up a space from a light emitting point placed on the main filter to a light incident end of the light transmitting means, for transmitting the reception-light signal output from the light emitting point of the main filter to the light incident end of the light transmitting means;

a second transparent resin body, filling up a space from a light emitting end of the light transmitting means to the reception-light signal detecting means, for transmitting the reception-light signal output from the light emitting end of the light transmitting means to the reception-light signal detecting means; and an opaque resin body, arranged in a space surrounding a light propagation route from the light emitting point of the main filter to the reception-light signal detecting means through the light transmitting means, for preventing light transmitted from a surrounding area of the optical module or stray light transmitting through the optical waveguide from being detected by the reception-light signal detecting means.

13. An optical module according to claim 1, further comprising:

a supplementary filter, arranged on a light incident end and/or a light emitting end of the light transmitting means, for reflecting light having the first wavelength band and transmitting the reception-light signal received from the main filter of the optical waveguide.

14. An optical module according to claim 1, further comprising:

a light shielding film, arranged on a light emitting surface of the light transmitting means except for a core portion of the light transmitting means, for shielding the reception-light signal detecting means from light transmitting through a cladding portion of the light transmitting means.

15. An optical module according to claim 1, wherein the light transmitting means is formed of a second optical fiber having a core portion through which the reception-light signal transmits.

16. An optical module according to claim 1, wherein the light transmitting means is formed of a second optical waveguide having a core through which the reception-light signal transmits.

17. An optical module according to claim 1, wherein an angle between the first direction of the light transmitting means and the second direction of the first core ranges from 15 to 30 degrees.

18. An optical module according to claim 1, wherein the light transmitting means prevents stray light occurring in the optical waveguide from being detected in the reception-light signal detecting means.

19. An optical module comprising:

a laser that emits a transmission-light signal having a first wavelength band;

an optical waveguide comprising a first core and a second core, wherein a first end of the first core is arranged to receive the transmission-light signal from the laser, and wherein a first end of the second core is arranged to receive a reception-light signal having a second wavelength band from an optical fiber;

a wavelength filter disposed on the optical waveguide adjacent to a second end of the first core and a second end of the second core, wherein the wavelength filter passes the reception-light signal having the second wavelength band from the second core and reflects a major portion of the transmission-light signal having the first wavelength band from the second end of the first core to the second end of the second core, wherein the major portion of the transmission-light signal is thereby transmitted by the second core to the optical fiber;

a light transmitting element that receives the reception-light signal passed through the wavelength filter;

a light detector that receives the reception-light signal from the light transmitting element; and a light shielding film arranged on a light emitting surface of the wavelength filter except for an unshielded area of the light emitting surface of the wavelength filter corresponding to the location of the second end of the second core, such that the reception-light signal transmitted by the second core can pass through the unshielded area of the light emitting surface of the wavelength filter to the light transmitting element.

20. The optical module of claim 19, wherein the second end of the first core and the second end of the second core are connected at a connection point.

21. The optical module of claim 19, wherein a first end of the light transmitting element faces the second end of the second core and wherein an extending direction of the first end of the light transmitting element agrees with an extending direction of the second end of the second core.

22. An optical module comprising:

a laser that emits a transmission-light signal having a first wavelength band;

an optical waveguide comprising a first core, a second core, and a third core, wherein a first end of the first core is arranged to receive the transmission-light signal from the laser, a first end of the second core is arranged to receive a reception-light signal having a second wavelength band from an optical fiber, and a first end of the third core is arranged to receive the reception-light signal from a second end of the second core;

a wavelength filter disposed on the optical waveguide such that one side of the wavelength filter is disposed adjacent to a second end of the first core and a second end of the second core and an opposing side of the wavelength filter is disposed adjacent to the first end of the third core, wherein the wavelength filter passes the reception-light signal having the second wavelength band from the second core to the third core and reflects a major portion of the transmission-light signal having the first wavelength band from the second end of the first core to the second end of the second core, wherein the major portion of the transmission-light signal is thereby transmitted by the second core to the optical fiber;

a light transmitting element that receives the reception-light signal from the third core;

a light detector that receives the reception-light signal from the light transmitting element; and a light shielding film arranged on a light emitting surface of the optical waveguide except for an unshielded area of the light emitting surface of the optical waveguide corresponding to the location of a second end of the third core, such that the reception-light signal transmitted by the third core can pass through the unshielded area of the light emitting surface of the optical waveguide to the light transmitting element.

23. The optical module of claim 22, wherein the second end of the first core and the second end of the second core are connected at a connection point.

24. The optical module of claim 22, wherein a first end of the light transmitting element faces a second end of the third core and wherein an extending direction of the first end of the light transmitting element agrees with an extending direction of the second end of the third core.

* * * * *